US010410463B2

(12) United States Patent
Elias

(10) Patent No.: US 10,410,463 B2
(45) Date of Patent: Sep. 10, 2019

(54) SYSTEMS AND METHODS FOR REMOVING SPECIAL SYMBOLS DURING A CASCADE FEATURE OF A GAME

(71) Applicant: Gamesys Ltd., London (GB)

(72) Inventor: Hans Elias, Hertfordshire (GB)

(73) Assignee: Gamesys, Ltd., London (GB)

( * ) Notice: Subject to any disclaimer, the term of this patent is extended or adjusted under 35 U.S.C. 154(b) by 209 days.

(21) Appl. No.: 15/180,511

(22) Filed: Jun. 13, 2016

(65) Prior Publication Data

US 2016/0364944 A1 Dec. 15, 2016

Related U.S. Application Data

(60) Provisional application No. 62/174,509, filed on Jun. 11, 2015.

(51) Int. Cl.

*A63F 13/00* (2014.01)
*G07F 17/32* (2006.01)
*G07F 17/34* (2006.01)

(52) U.S. Cl.

CPC ...... *G07F 17/3213* (2013.01); *G07F 17/3225* (2013.01); *G07F 17/3258* (2013.01); *G07F 17/3267* (2013.01); *G07F 17/34* (2013.01)

(58) Field of Classification Search

CPC .. G07F 17/34; G07F 17/3213; G07F 17/3267; G07F 17/326; G07F 17/3258

See application file for complete search history.

(56) References Cited

U.S. PATENT DOCUMENTS

| | | | |
|---|---|---|---|
| 6,910,962 | B2 | 6/2005 | Marks et al. |
| 7,144,322 | B2 | 12/2006 | Gomez et al. |
| 7,553,231 | B2 | 6/2009 | Rodgers et al. |
| 7,749,063 | B2 | 7/2010 | Belger et al. |
| 8,105,145 | B2 | 1/2012 | Jaffe |
| 8,152,623 | B2 | 4/2012 | Fiden |
| 8,177,622 | B2 | 5/2012 | Englman |
| 8,192,272 | B2 | 6/2012 | Thomas et al. |
| 8,192,275 | B2 | 6/2012 | Aoki et al. |
| 8,246,447 | B2 | 8/2012 | Gauselman |
| 8,251,798 | B2 | 8/2012 | Belger et al. |
| 8,366,538 | B1 | 2/2013 | Saunders et al. |
| 8,414,380 | B2 | 4/2013 | Saunders et al. |

(Continued)

FOREIGN PATENT DOCUMENTS

WO WO2008082539 7/2008

OTHER PUBLICATIONS

Written Opinion for PCT/IB2014/000423 dated Sep. 3, 2014, 4 pp.

(Continued)

*Primary Examiner* — Justin L Myhr

(74) *Attorney, Agent, or Firm* — Fincham Downs LLC; Magdalena M. Fincham

(57) ABSTRACT

In accordance with some embodiments, an online game server provides a reel-type slot machine game interface that is modified over a course of a game and wherein the game includes a bonus feature that is triggered once a sufficient number of special symbols (e.g., scatter symbols) are accumulated by a player. In accordance with some embodiments, in order to qualify for the bonus feature, the special symbols need to be accumulated as a result of a single wager and original spin and any cascades that are triggered by an outcome of the original spin.

19 Claims, 13 Drawing Sheets

(56) References Cited

U.S. PATENT DOCUMENTS

| | | | |
|---|---|---|---|
| 8,430,737 B2 | 4/2013 | Saunders | |
| 8,454,429 B2 | 6/2013 | Jaffe et al. | |
| 8,512,138 B2 | 8/2013 | Saunders | |
| 8,523,659 B2 | 9/2013 | Evans | |
| 2004/0072612 A1 | 4/2004 | Rodgers et al. | |
| 2008/0108413 A1 | 5/2008 | Gelber et al. | |
| 2008/0132309 A1 | 6/2008 | Baumgartner et al. | |
| 2010/0004050 A1* | 1/2010 | Caputo | G07F 17/3265 463/21 |
| 2010/0062827 A1 | 3/2010 | Hoffman et al. | |
| 2011/0111830 A1 | 5/2011 | Seelig et al. | |
| 2012/0238348 A1 | 9/2012 | Aoki et al. | |
| 2012/0295688 A1 | 11/2012 | Watkins et al. | |
| 2013/0190067 A1 | 7/2013 | Saunders | |
| 2015/0018071 A1 | 1/2015 | Elias et al. | |

OTHER PUBLICATIONS

International Preliminary Report on Patentability for PCT/IB2014/000423 dated Aug. 25, 2015; 5 pps.

International Search Report or PCT/IB2014/000423 dated Sep. 3, 2014, 8 pp.

Website: http://www.slotozilla.com/free-slots/davinci-diamonds "Davinci Diamonds Slot Machine Game to Play Free in IGT's Online Casinos" Download date Sep. 13, 2016; 13 pps.

Website: http://www.slots4play.com/freeslots/wms/play-invaders-from-planet-moolah-slots "Invaders from the Planet Moolah slot online" Download date Sep. 13, 2016; 9 pps.

Website: https://www.gamingslots.com/slots/gamesys/jungle-jump-slot/ "Jungle Jump Animal" Download date Sep. 13, 2016; 3 pps.

* cited by examiner

SYSTEMS AND METHODS FOR REMOVING SPECIAL SYMBOLS DURING A CASCADE FEATURE OF A GAME

CLAIM OF PRIORITY

The present application claims the benefit of U.S. Provisional Application 62/174,509 filed on Jun. 11, 2015 in the name of Hans Elias. The entirety of this application is incorporated by reference herein.

DETAILED DESCRIPTION OF EXAMPLE EMBODIMENTS

I. Introduction

Figure 1:
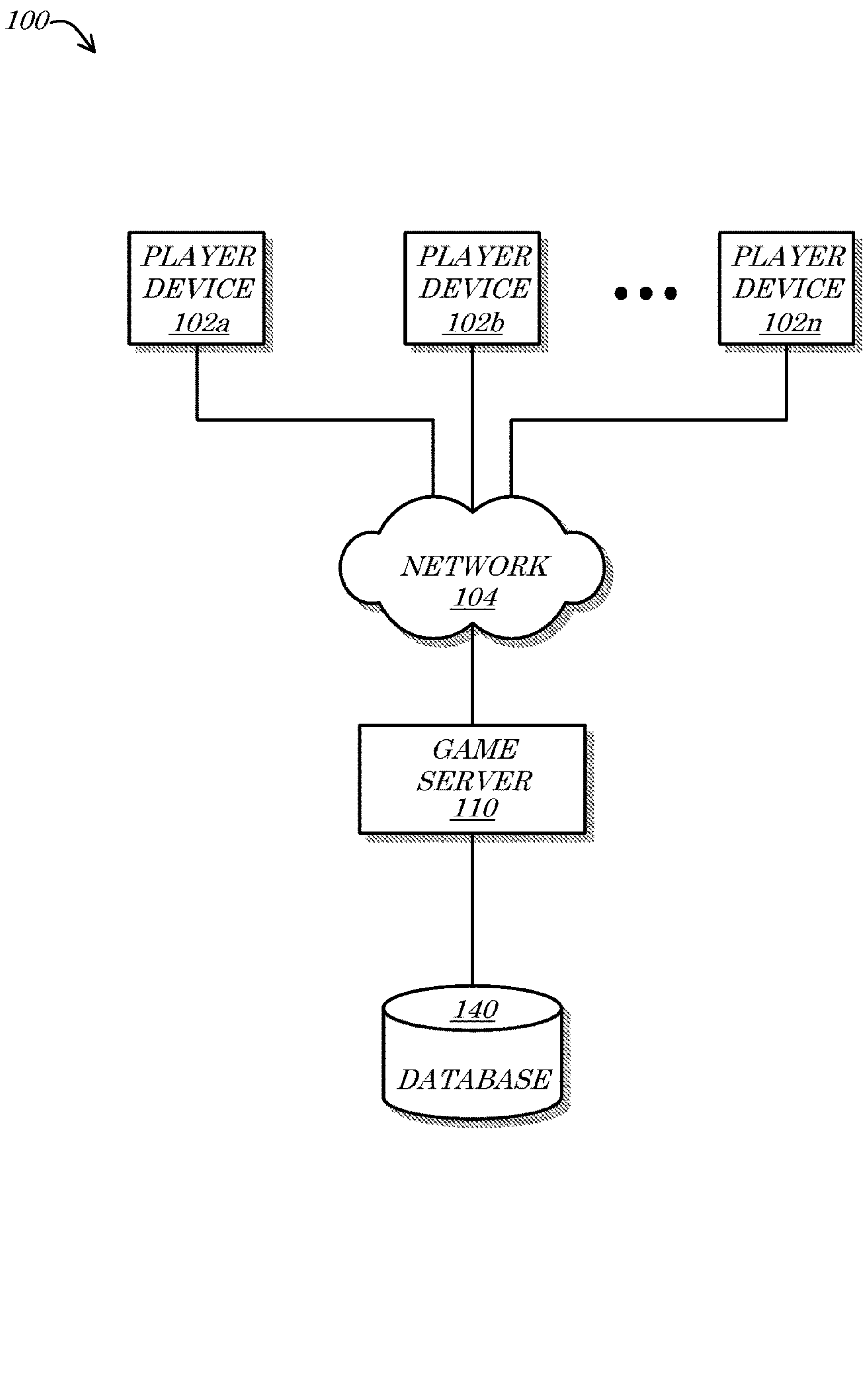
FIG. 1 is a schematic diagram of an embodiment of a gaming system in accordance with one or more embodiments described herein.

At least some embodiments described herein relate to electronic games (e.g., such as online wagering games) and particularly to an online electronic reel slot machine game that involves both scatter symbols and a cascade feature that is triggered once a sufficient number of scatter symbols are accumulated by the player (and removed from the online game interface) during one or more cascades triggered for a given wager of the game.

Games, whether wagering or non-wagering, are a popular past-time for millions of people all over the world. Electronic games in particular are becoming more and more popular, particularly ones playable online using a computer connected to a network. For example, according to some reports more than 200 million people play social games every month and online games recently passed e-mail as the second-most popular activity online, second only behind social networking. Accordingly, there is a need to continue to create exciting electronic games which maintain players' interest and stand out from the multitude of available online games.

Various "reel-type" or reeled slot machine games are popular with many players, whether deployed on dedicated gaming devices (e.g., a traditional slot machine device in a casino, operable primarily to facilitate one or more slot machine games) or on non-dedicated computing devices (e.g., personal computers, mobile devices, laptops or table computers, which are operable to perform a variety of functions in addition to supporting reeled slot machine games). A reeled slot machine game typically includes a plurality of reels, each reel including a plurality of symbol positions for display of a reel symbol. A symbol is a visual representation of an element or indicia, used in the game to indicate to the player whether the player qualifies for an award. A reel symbol is a symbol output on a reel of a game interface. The term "symbol" as used herein may refer to a reeled symbol or a symbol of another type of game that is not a reel-type slot machine game (e.g., a game consisting of a grid, such as a bingo game, or any other type of interface that may be applied to embodiments described herein). A reel may be mechanical (e.g., in a physical dedicated gaming device on a casino floor) or virtual (e.g., a software representation of a reel on an electronic display of a dedicated or non-dedicated device). In a reel-type slot machine game the reels spin (or representations of virtual reels are made to look as if they spin) after a player places a wager on the game, provides another qualifying input or another reel-initiation event occurs. The reels then stop to display generated combinations of symbols on the reels. The combinations of symbols shown along one or more paylines may be determined prior to the stopping of the reels. For example, one or more random or pseudo-random numbers may be determined for a given spin and the symbol combination(s) to display along one or more paylines may be selected based on the random or pseudo-random number, as would be understood by one of ordinary skill in the art.

It should be noted that embodiments described herein are not limited to reel-type slot machine games. For example, the embodiments may be implemented in a card game (e.g., a multi-hand video poker game), a grid type game (e.g., a bingo game) or any type of game in which representations of outcomes are output in a configuration which lends itself to the wild symbol game mechanic described herein. Thus, it should be noted that although the term "spin" is used to refer to a game event which results in an outcome, the term "spin" is intended to encompass any type of game event (not limited to a game event in a reel-type slot machine game) for which an outcome may be determined.

The "outcome" of a spin or other type of game event, as the term is used herein, is the set of symbols as displayed in a set of symbol positions which are evaluated to determine whether the spin results in an award or prize. In a reel-type slot machine game, an outcome of a spin may refer to the symbols displayed along symbol positions comprising one or more paylines of the game. If a generated symbol or combination of symbols is a winning symbol or combination of symbols (i.e., a symbol or combination of symbols associated with an award), the award corresponding to the winning symbol or winning symbol combination is provided or output (e.g., if the generated winning symbol or winning combination of symbols appears along an active payline associated with the reels or in a scatter pay of a reel-type slot machine game). The symbols along a payline at the end of a spin (i.e., once the reels are stopped and the symbols in the symbol positions are positioned such that a player may determine whether he/she qualifies for an award as a result of the spin) are referred to as the "outcome of the payline" herein. Thus, an outcome of a spin may comprise one or more outcomes of paylines. Further, an outcome of a payline may include a winning combination of symbols along with one or more additional symbols. For example, in a five (5) reel slot machine game, a payline may include five (5) symbol positions (e.g., one symbol position in each reel of the 5 (five) reels). However, one or more possible winning combinations of symbols may comprise three (3) or four (4) symbol combinations such that an occurrence of a winning combination of symbols along the payline will include the symbols comprising the winning combination as well as additional symbols that, while not part of the winning combination of symbols, are also along the payline and thus included in the outcome of the payline. For example, assume an occurrence of three (3) cherry symbols along a payline in a fruit-themed five (5) reel slot machine type game corresponds to an award of two (2) credits and an outcome of a spin includes the following symbols in the symbol positions comprising that payline: cherry-cherry-lemon-orange-cherry. In accordance with rules of one particular example game, the award corresponding to the three cherry symbols along the payline may be awarded to the player and the three cherry symbols may be referred to as the winning combination of symbols while the lemon and orange symbols are not part of the winning combination of symbols but are still part of the outcome of the payline. Such symbols which are part of an outcome of a payline but not symbols which are part of a winning combination of a payline are referred to as non-qualifying symbols herein. The symbols which are part of the winning combination and comprise the outcome of the payline are referred to as qualifying symbols herein.

One game feature available in some reeled games is the use of one or more special symbols in some particular manners. A special symbol may be any symbol which functions in a manner different from the regular symbols in the game (e.g., contributes towards a bonus or winning outcome in a different way than do the regular symbols in the game, provides an additional benefit or enhancement beyond contributing to a payout in a regular manner). One example of a special symbol is a scatter symbol. A scatter symbol is a symbol which counts towards a winning combination of symbols even though it does not appear along a payline of the game, such that a payout may be won when a predetermined number (e.g., three) scatter symbols appear anywhere in the symbol matrix comprising the reels at the resolution of a reel spin. Another example of a special symbol is a wild symbol. A wild symbol is a symbol which may be placed in a symbol position of a reel and which changes, replaces or functions as one of the regular symbols on one of the reels (e.g., a wild symbol may be treated as equivalent to any of the regular symbols of the game). In some games a wild symbol is made to replace a regular symbol after the reels stop and an initial outcome for a payline or spin is displayed while in other game a wild symbol may be utilized on a reel to replace a regular symbol on a reel prior to any initial payline outcome being displayed to a player. Use of special symbols in games creates additional opportunities for winning combinations. Applicant has recognized that there is a continuing need for new ways of utilizing special symbols in a game (e.g., a reeled slot machine game) to create added excitement and reward opportunities within the game.

Another game feature available in some reeled slot machine games is a cascade feature. In a cascade feature, one or more symbols (e.g., regular symbols) which are placed in symbol positions of reels upon a resolution of a spin (e.g., once the reels stop spinning and the outcome of the spin has been evaluated for winning combinations and payouts have been awarded) are removed from the symbol matrix and replaced by moving down one or more symbols from a symbol position immediately above the symbol being replaced, such that the symbols on the reels appear to cascade in a downward direction. For example, in some games the symbols comprising the winning combination of symbols may be removed and replaced in a cascade feature; after the cascade the symbols on the reels may be re-evaluated to determine whether any new winning combinations of symbols are formed as a result of the cascade. Applicants have recognized that there is a need for new and improved methods of utilizing a cascade feature in a game.

Described herein is a particular "special symbol cascade feature" applicable to any game (e.g., a reeled slot-machine type game) in which payouts are awarded for certain predetermined combinations of symbols appearing along paylines of the game (e.g., for winning combinations of symbols along paylines comprising symbol positions across a plurality of the reels). In accordance with some embodiments, (i) the special symbols or at least one type of special symbol (e.g., the scatter symbols) placed in symbol positions upon an initial resolution of a game event (e.g., once the reels of a reeled slot machine stop spinning) are removed from the symbol position after an initial evaluation of paylines and awarding of payouts, if any, based on the initially placed symbols; (ii) the removed special symbols are counted towards a bonus qualification count of special symbols (e.g., a bonus feature is triggered once a predetermined number of such special symbols have been removed and counted within a predefined game event or set of game events); (iii) a cascade feature is initiated such that the symbols above the removed special symbols are moved downwards to replace the removed special symbols (and new symbols are placed into vacated symbol positions if no symbol had been displayed above the vacated symbol position, as may be the case when the top-most symbol of a reel or column is moved downwards or removed); and (iv) paylines are re-evaluated to determine whether additional winning combinations have been created as a result of the replacing of removed symbols during the cascade feature. The cascade feature may be displayed as an animation that displays symbols moving down into vacated symbol positions from above.

In some embodiments, at least some regular symbols may also be removed from the symbol matrix and replaced via a cascade feature. For example, regular symbols which comprise winning combinations of symbols may be removed and replaced via a cascade feature.

In some embodiments, another cascade may be initiated if at least one of the following occurs as a result of a preceding cascade: (i) one or more additional scatter symbols is placed in the symbol matrix, removed and added to the running count of special symbols for triggering the bonus feature; and (ii) a new winning combination of regular symbols is created as a result of the preceding cascade and at least the regular symbols comprising the winning combination of regular symbols are removed from the symbol matrix once a corresponding payout is awarded. In one embodiment, a special symbol may only be removed from the symbol matrix and counted toward a running count of special symbols for triggering a bonus feature if the special symbol is part of a winning combination of symbols.

In some embodiments, the following steps may be repeated until at least one termination condition is satisfied: (i) removing special symbols placed in symbol positions and replacing them via a cascade feature; (ii) re-evaluating paylines; (iii) awarding of payouts due to newly created winning combinations as a result of a cascade; (iv) removing special symbols and applying them towards a running count of special symbols; and (iv) triggering additional cascades if at least one special symbol is placed in a symbol position during a preceding cascade. One example of a termination condition is that no additional special symbols are placed in any symbol positions as a result of a cascade. Another example of a termination condition is that a sufficient number of special symbols are removed and added to the bonus qualification count to trigger the bonus feature. Another example of a termination condition is that no symbols (regular or special) are removed after a cascade (e.g., because no additional special symbols were added to the symbol matrix and no additional winning combinations of symbols were created as a result of the last cascade).

In one embodiment, no additional wager is received from the player for the cascades, re-evaluation of the paylines and providing of resulting award(s), if any (i.e., the player's wager for the original spin or game event which resulted in one or more special symbols to be removed and replaced via a cascade feature also qualifies the player to receive any awards resulting from the replacements in accordance with the rules of the game). In some embodiments, this is only the case if the player placed the maximum allowable wager on the game event.

In some embodiments, special symbols (e.g., scatter symbols) may only be removed and replaced in a cascade feature (and added to a running count of removed special symbols) if a qualifying condition is satisfied for the game event in which the special symbol is placed. Examples of a qualifying condition include, but are not limited to: (i) the special symbol being placed along an active payline for which an award is to be provided to a player (e.g., a payline for which the player provided a wager and will thus receive a payout); (ii) the special symbol being part of a winning combination of symbols; (iii) the player having provided a maximum allowable wager for the game event; (iv) the player having maintained at least a minimum average wager during a wagering session or within a predetermined number of game events; and (v) the player being associated with a certain required player rating, level or category.

As described, in some embodiments one or more regular symbols may also be removed from symbol position(s), along with the special symbols placed for a game event (if any). For example, in one embodiment, all regular symbols which are part of a winning combination of a payline may be removed and replaced via a cascade feature once the payline is determined to include the winning combination and the corresponding payout is provided. In one embodiment, all regular symbols along a payline which includes a winning combination of symbols may be removed and replaced via a cascade feature. While the regular symbols which are removed may not be counted towards a bonus qualification count of special symbols, the removal of these symbols may nevertheless create additional winning opportunities as replacement symbols are dropped down from symbol positions above the vacated symbol position.

In some embodiments, the determination of an initial outcome for a game event (the symbols to initially place in symbol positions, prior to any cascades being triggered) may comprise a two-part process. The two parts of the process may be performed in parallel or in series.

In some embodiments, a first part of a process for determining an outcome of a spin may comprise determining one or more outcomes (e.g., an outcome for each payline of the game and/or a symbol for each symbol position of the game) using a Random Number Generator (RNG), as would be understood by one of ordinary skill in the art. For example, at least one pseudo-random number generated by the RNG (e.g., based on an algorithm for generating pseudo-random numbers) may be determined for a particular spin, the at least one pseudo random number corresponding to particular symbols to appear in respective symbol positions visible to the player at the completion of the spin or to a total payout to be provided to the player as a result of the spin (and then selecting the symbols to display along active paylines for the spin in order to effectuate the total payout so determined). In some embodiments, a distinct pseudo-random number may be determined for at least one of (i) at least one active payline of the spin, (ii) at least one symbol position, and (iii) at least one reel (or other set of symbol positions in games which are not reel-based slot machine type of games). In either embodiment, the first process for determining an outcome of a spin may comprise determining, in some manner and based on an RNG, the symbols to be displayed on the symbol positions of each reel visible to the player at the completion of the spin. This first process (and variations thereof described above) would be understood by one of ordinary skill in the art.

In some embodiments, a second part of a process for determining an outcome for a spin or other game event may be employed to modify the symbols to be displayed (as determined by the first process) in the symbol positions of the game. For example, the second process may comprise determining that a special symbol (e.g., a scatter symbol) should be placed on a particular reel (or in a particular symbol position). In one embodiment this second part of the process may comprise substituting the special symbol in place of a regular symbol that would otherwise have been placed in a symbol position based on the first part of the process. In accordance with some embodiments, the second part of the process for determining an outcome of a game event may run or be executed essentially parallel to (e.g., run at the same time as) the first part of the process for a given spin and the result of the first process may be overlaid or combined with the result of the first process before the reels stop spinning (i.e., prior to resolution of the spin), such that the outcome of the spin determined based on the first process is modified by a result of the second process.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention (s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. A game may be playable on a personal computer online in web browsers, on a game console and/or on a mobile device such as a smart-phone or tablet computer. A game may also be playable on a dedicated gaming device (e.g., a slot machine in a brick-and-mortar casino). "Gaming" thus refers to play of a game.

A "casual game", as the term is used herein unless specified otherwise, may comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein unless specified otherwise, refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein, may comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" refers to play of a wagering game.

The term "game provider", as used herein unless specified otherwise, refers to an entity or system of components which provides, or facilitates the provision of, games for play and/or facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate or facilitate a gambling website over which wagers are accepted and results of wagering games are provided.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

A "session" comprises a period of time spanning a plurality of event instances, game instances, spins or turns of a game, the session having a defined start and defined end. An "event instance", "game instance", "game event", "session" or "turn" is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance). An event instance or turn may comprise an event instance or turn of a primary game or an event instance or turn of a bonus round, mode or feature of the game. Accordingly, a session may refer to a session of a primary game or a session of a bonus round, mode or feature of the game, depending on the context.

An "outcome" should be differentiated from a "result" in the present description in that an "outcome" is a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass prizes which may comprise awards, payouts, discounts, eligibility, advancement in a game or other benefits (whether monetary or non-monetary, tangible or intangible) to a player and that any reference to a "prize", "award" or "payout" may refer to any or all of the foregoing, unless the context explicitly indicates otherwise.

A "bonus round", "bonus mode" or "bonus feature" of a game, as the terms are used interchangeably herein unless indicated otherwise, may refer to a secondary game, entry into which is triggered via one or more events which may occur in a base or primary game. Typically, a player may be able to qualify to play a bonus feature based on one or more outcomes in a primary game, such as in a basic mode or a qualifying mode. In accordance with at least some embodiments described herein, a player may qualify to play a bonus feature if a predetermined number or minimum number of special symbols (e.g., scatter symbols) are placed and removed from a symbol interface of the primary game during a single game instance (e.g., spin) of the game, wherein a single game instance encompasses any cascades which may be triggered as a result of an initial outcome and/or any outcomes created as a result of one or more resulting cascades. A bonus round may be played in accordance with a set of rules that is different from those of a primary game, and may be accompanied by displays, colors, sounds, animated sequences, game play and/or prizes that are not part of the primary game. In one embodiment, a primary or base game application or program may include programming or instructions which will automatically begin a bonus round after the player has achieved a triggering event or qualifying condition in the base or primary game.

"Virtual currency" as the term is used herein unless indicated otherwise, refers to an in-game currency that may be used as part of a game or one or more games provided by a game provider as (i) currency for making wagers, and/or (ii) to purchase or access various in-game items, features or powers. References to an "award", "prize" and/or "payout" herein are intended to encompass such in the form of virtual currency, credits, real currency or any other form of value, tangible or intangible.

A "credit balance", as the term is used herein unless indicated otherwise, refers to (i) a balance of currency, whether virtual currency or real currency, usable for making wagers or purchases in the game (or relevant to the game), and/or (ii) another tracking mechanism for tracking a player's success or advancement in a game by deducting therefrom points or value for unsuccessful attempts at advancement and adding thereto points or value for successful attempts at advancement. A credit balance may be increased or replenished with funds external to the game. For example, a player may transfer funds to the credit balance from a financial account or a gaming establishment may add funds to the credit balance due to a promotion, award or gift to the player.

II. Description of Figures

Example Systems

Referring now to the figures, FIG. 1 depicts a block diagram of an example system 100 according to some embodiments. The system 100 may comprise a plurality of player devices 102*a*-102*n* in communication with a game server 110 via a network 104. For purposes of brevity, any or all of the player devices 102*a*-102*n* will be referred to as a player device 102 herein, even though the plurality of player devices 102*a*-102*n* may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device with which game server 110 is operable to communicate in order to at least access the data in database 140

(e.g., another server device remote from game server 140, operable to determine outcomes for an event instance of a game). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts.

In some embodiments a game server 110 and/or one or more of the player devices 102 stores and/or has access to data useful for facilitating play of a game. For example, game server 110 and/or a player device 102 may store (i) one or more probability databases or subroutines for determining one or more outcome(s) for an event instance, spin or turn of a game (e.g., a first probability table and/or subroutine for determining the regular symbols comprising an outcome and a second probability table and/or subroutine for determining whether or how many special symbols to include in the outcome); (ii) a current state or status of a game or game session (e.g., a number of special symbols which have been removed and added to a running count towards qualifying for a bonus feature, as a result of a cascade feature in a game); (iii) one or more online user interfaces or data for generating an online user interface for use in a game; (iv) one or more game themes for a game and/or (v) profiles or other personal information associated with a player of a game. It should be noted that in some embodiments such data may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

A game server 110 may comprise a computing device for facilitating play of a game (e.g., by receiving an input from a player, determining an outcome for a game, causing an outcome of a game to be displayed on a player device, determining whether to remove a special symbol at a particular symbol position of a game interface and replace it with a symbol above the symbol position via a cascade feature, facilitating a wager and/or a provision of a payout for a game). For example, the game server 110 may comprise a server computer operated by a game provider or another entity (e.g., a social network website not primarily directed at providing games). In some embodiments, the game server may determine an outcome for spin of a game by requesting and receiving such an outcome from another remote server operable to provide such outcomes (e.g., a server comprising a random number generator module). In some embodiments, the game server 110 may further be operable to facilitate a game program for a game (e.g., a wagering game).

In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc.).

In some embodiments, game server 110 may comprise two or more server computers operated by the same entity (e.g., one server being primarily for storing states of games in progress and another server being primarily for storing mechanisms for determining outcomes of games, such as a random number generator).

Examples of processes that may be performed by the game server 110 (directly or indirectly) may include, but are not limited to: (i) determining an initial outcome (i.e., an outcome prior to any replacing or cascading of symbols) for a player; (ii) determining whether the outcome causes a cascade of symbols in the game; (iii) removing any special symbols and/or regular symbols which qualify for removal (e.g., regular symbols which are part of a winning combination of symbols) and replacing them with appropriate symbols (e.g., symbols cascaded down from a symbol position above the symbol position of the removed symbol); (iv) re-evaluating one or more paylines of the game for any additional winning combinations created as a result of any cascading or replacing of symbols; (v) transmitting an indication of outcomes to a player device; (vi) authorizing a game program to be downloaded to a player device; and/or (vii) modifying (or directing a player device to modify) a game interface which is outputting an outcome of a payline to reflect any cascading and/or replacing of symbols as a result of an initial outcome of the payline.

Turning now to a description of a player device 102, in accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Playstation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine) or a non-dedicated gaming device (e.g., an iPad™). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., outcomes for an event instance of the game, qualifying for a bonus feature of the game, credit balance of credits available for play of the game, a session result for a session of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). In another embodiment, a player device 102 may store some or all of the program instructions for determining, for example, (i) that an event instance has been triggered or initiated (and, in some embodiments, communicating such a trigger or initiation to game server 110); (ii) an initial outcome (i.e., an outcome prior to any cascade being triggered); (iii) whether a bonus feature has been triggered based on a minimum number of special symbols having been removed from the game interface; and/or (iv) whether any new winning combinations of symbols which may have been created as a result of a cascade feature. In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino accessed by one or more of the player devices 102.

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
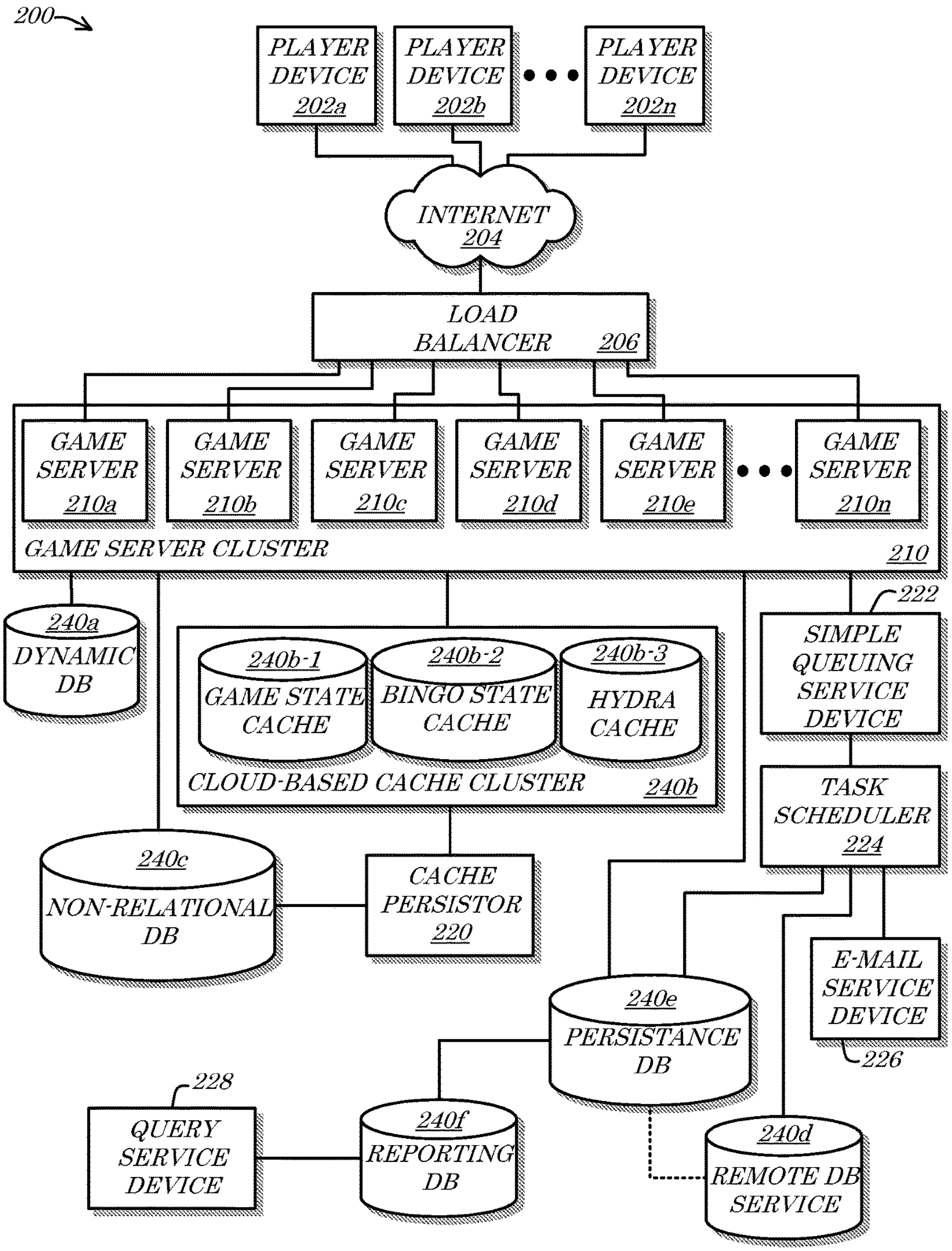
FIG. 2 is a schematic diagram of an embodiment of a gaming platform in accordance with one or more embodiments described herein.

Referring now to FIG. 2, illustrated therein is a block diagram of an example system 200, which is consistent with some embodiments. In accordance with some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f* The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player device 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances of available game types. A first game server 210*a*, for example, may host a first particular game instance of reeled slot machine game, a second game server 210*c* may host a second particular game instance of a reeled slot machine game, a third game server 210*c* may facilitate an online poker tournament, and/or a fourth game server 210*d* may provide an online bingo game.

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for some game types the game server cluster 210 may provide game outcomes to a controller device (not separately shown in FIG. 2) that times the release of game outcome information to the player devices 202*a-n* such as by utilizing a broadcaster device (also not separately shown in FIG. 2) that transmits the time-released game outcomes to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., a reeled slots themed game) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f* The query service 228 may then be utilized, for example, to query the reporting DB 240*f*, without taxing the live environment and/or production system directly accessible by the game server cluster 210.

Figure 3:
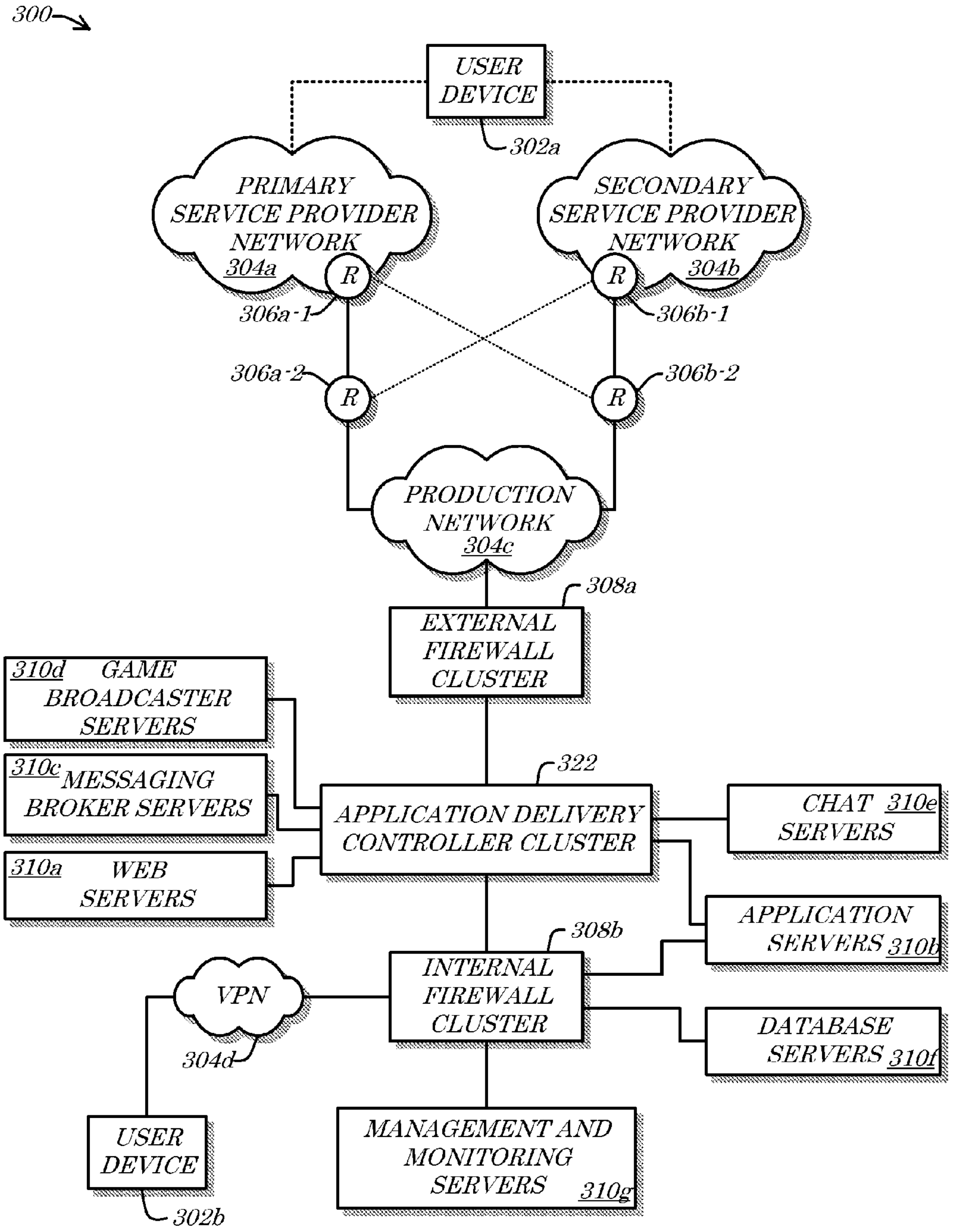
FIG. 3 is a schematic diagram of an embodiment of a gaming platform in accordance with one or more embodiments described herein.

Referring now to FIG. 3, illustrated therein is a block diagram of a system 300 according to some embodiments. In some embodiments, the system 300 may comprise and/or define a "front-end" architecture of a gaming platform such as a platform via which social, multiplayer, and/or online games may be played (e.g., one or more reel-type slot machine games that include a special symbol cascade feature as described herein). In some embodiments, the system 300 may comprise a plurality of user devices 302*a-b*, a plurality of networks 304*a*-*b* (e.g., a primary service provider network 304*a*, a secondary service provider network 304*b*, a production network 304*c*, and/or a VPN 304*d*), a plurality of routers 306*a*-*b*, a plurality of firewall devices 308*a*-*b*, a plurality of game servers 310*a*-*g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a*-*b*, 304*a*-*b*, 306*a*-*b*, 308*a*-*b*, 310*a*-*g*, 322 of the system 300 may be similar in configuration and/or functionality to any similarly named and/or numbered components described herein. Fewer or more components 302*a*-*b*, 304*a*-*b*, 306*a*-*b*, 308*a*-*b*, 310*a*-*g*, 322 (and/or portions thereof) and/or various configurations of the components 302*a*-*b*, 304*a*-*b*, 306*a*-*b*, 308*a*-*b*, 310*a*-*g*, 322 may be included in the system 300 without deviating from the scope of embodiments described herein. While multiple instances of some components 302*a*-*b*, 304*a*-*b*, 306*a*-*b*, 308*a*-*b*, 310*a*-*g* are depicted and while single instances of other components 322 are depicted, for example, any component 302*a*-*b*, 304*a*-*b*, 306*a*-*b*, 308*a*-*b*, 310*a*-*g*, 322 depicted in the system 300 may comprise a single device, a combination of devices and/or components 302*a*-*b*, 304*a*-*b*, 306*a*-*b*, 308*a*-*b*, 310*a*-*g*, 322, and/or a plurality of devices, as is or becomes desirable and/or practicable. Similarly, in some embodiments, one or more of the various components 302*a*-*b*, 304*a*-*b*, 306*a*-*b*, 308*a*-*b*, 310*a*-*g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be or comprise a smart phone, smart watch, tablet or personal computer capable of accessing a network. The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 302*a*. The first user device 302*a* may, for example, submit a call for an online gaming interface (e.g., the interface 800 of any of FIGS. 8A-8E) to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a*-*g*. In the case that the first user device 302*a* is utilized to access an online gaming interface (not explicitly shown; e.g., the interface 800 of any of FIGS. 8A-8E herein) for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines and/or automatic game play engines or logic modules) may be called and/or managed by the application delivery controller cluster 322.

In some embodiments, the messaging broker servers 310*c* may receive and/or retrieve messages from the first user device 302*a* (and/or from one or more of the other servers 310*a*-*b*, 310*d*-*g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302*a* (e.g., facilitating a decoupling of services provided by various applications on and/or from the various servers 310*a*-*b*, 310*d*-*g*). According to some embodiments, the game broadcaster servers 310*d* may provide scheduled releases of information descriptive of an online game. The game broadcaster servers 310*d* may, for example, provide a broadcast feed random (and/or pseudo-random) number results or other data useful for facilitating a game, and/or special symbol placement information (e.g., how many special symbols to include in an outcome, particular symbol positions for placement of the special symbols, etc.), that may be accessed by (and/or transmitted to) the first user device 302*a* (e.g., in connection with the play of a reel-type slot game that includes a special symbol cascade feature, as described herein, and/or other game for which broadcast information may be utilized). In some embodiments, the chat servers 310*e* may provide, manage, and/or facilitate communications between the first user device 302*a* (and/or first user thereof) and one or more other player/user devices (such as a second user device 302*b* and/or other player/user devices not shown in FIG. 3).

According to some embodiments, the second user device 302*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online game provider may, for example, utilize the second user device 302*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 302*b* may, for example, be required to provide credentials to and/or otherwise access the application delivery controller cluster 322 and/or servers 310*a*-*g* via the internal firewall cluster 308*b*.

In some embodiments, the database servers 310*f* may provide access to one or more databases and/or data stores (e.g., not shown in FIG. 3; for data storage and/or retrieval).

In some embodiments, the management and monitoring servers 310*g* may provide services such as monitoring, reporting, troubleshooting, analysis, configuring, etc. to the second user device 302*b*. The second user device 302*b* may, for example, access the management and monitoring servers 310*g* and/or the database servers 310*f* to run reports descriptive of online gaming operations, game play, and/or game referral setup, management, and/or analysis. According to some embodiments, either or both of the user devices 302*a-b* in conjunction with one or more of the servers 310*a-g* and/or the application delivery controller cluster 322 may conduct (in whole or in part), facilitate, and/or otherwise be associated with execution of one or more stored procedures, applications, processes, and/or methods (e.g., the process 700 of FIG. 7 herein, and/or one or more portions and/or combinations thereof) as described herein. In some embodiments, the user devices 302*a-b* in conjunction with one or more of the servers 310*a-g* and/or the application delivery controller cluster 322 may facilitate the execution of procedures, applications and processes that differ between the first user device 302*a* and the second user device 302*b*, creating different gaming experiences for the two users of these respective devices, even if playing the same game, in the same game session, etc.

Utilization of the term "server" with respect to the servers 310*a-g* of the system 300 of FIG. 3 is meant solely to ease description of the configuration and/or functionality of the servers 310*a-g*. The term "server" is not intended to be limiting with respect to any particular hardware, software, firmware, and/or quantities thereof utilized to implement any or all of the servers 310*a-g* of the system 300. Similarly, while multiple types and/or instances of the severs 310*a-g* are depicted in FIG. 3, any or all of the servers 310*a-g* may be implemented in, on, and/or by one or multiple computer server and/or other electronic devices.

Figure 4:
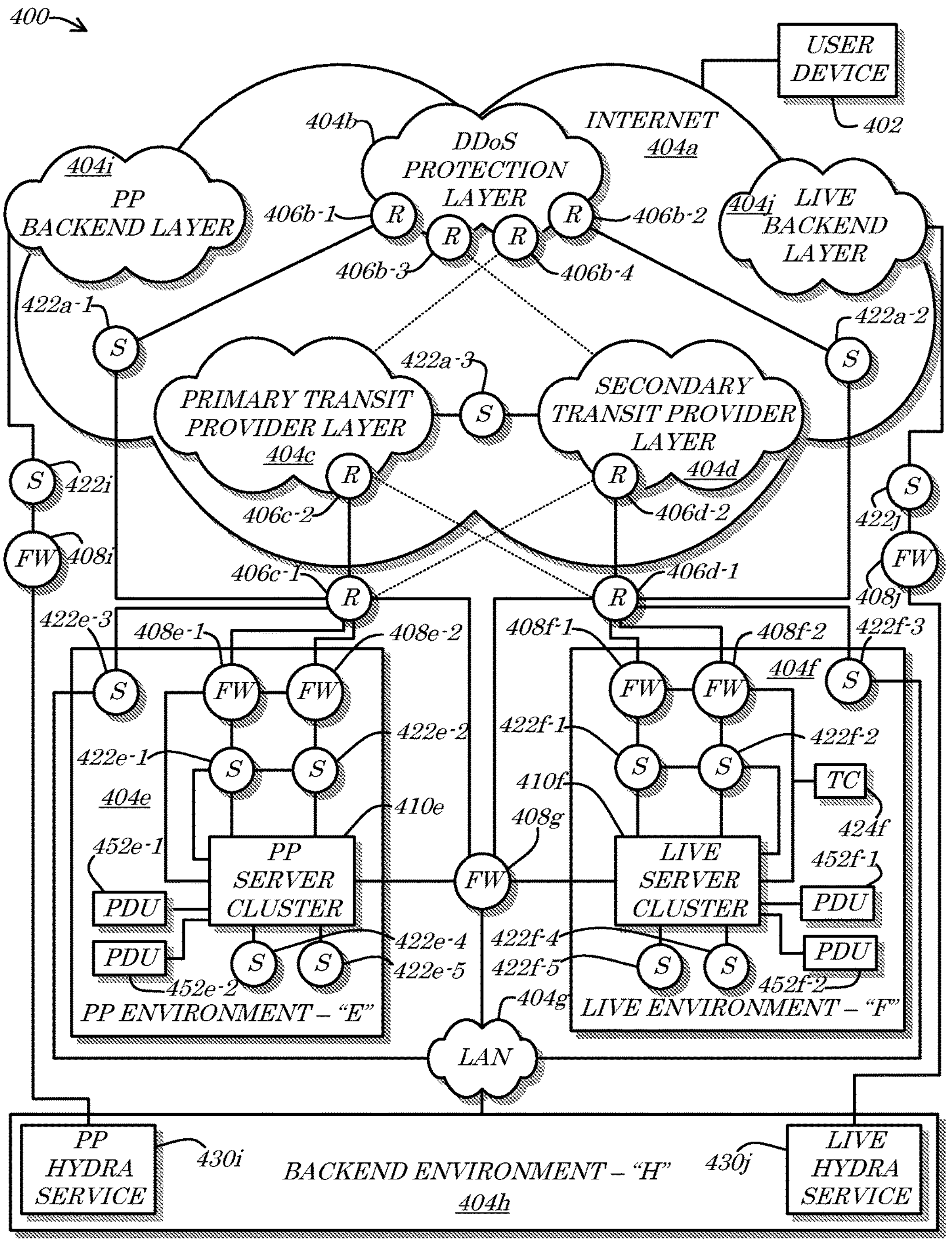
FIG. 4 is a schematic diagram of an embodiment of a gaming platform in accordance with one or more embodiments described herein.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more reel-type slot machine games that include a special symbol cascade feature, as described herein). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404*a-j* (e.g., the Internet 404*a*, a Distributed Denial-of-Service (DDoS) protection layer 404*b*, a primary transit provider layer 404*c*, a secondary transit provider layer 404*d*, a Pre-Production (PP) environment 404*e*, a live environment 404*f*, a LAN 404*g*, a backend environment 404*h*, a PP backend layer 404*i*, and/or a live backend layer 404*j*), a plurality of routers 406*b-d*, a plurality of firewall devices 408*e-g*, 408*i-j*, a plurality of servers 410*e-f* (e.g., a PP server cluster 410*e* and/or a live server cluster 410*f*), a plurality of switching devices 422*a*, 422*e-f*, 422*i-j*, a Terminal Concentrator (TC) 424*f*, a plurality of "hydra" services 430*i-j* (e.g., a PP hydra service 430*i* and/or live hydra service 430*j*), and/or a plurality of Power Distribution Unit (PDU) devices 452*e-f*.

According to some embodiments, any or all of the components 402, 404*a-j*, 406*b-d*, 408*e-g*, 408*i-j*, 410*e-f*, 422*a*, 422*e-f*, 422*i-j*, 424*f*, 430*i-j*, 452*e-f* of the system 400 may be similar in configuration and/or functionality to any similarly named and/or numbered components described herein. Fewer or more components 402, 404*a-j*, 406*b-d*, 408*e-g*, 408*i-j*, 410*e-f*, 422*a*, 422*e-f*, 422*i-j*, 424*f*, 430*i-j*, 452*e-f* (and/or portions thereof) and/or various configurations of the components 402, 404*a-j*, 406*b-d*, 408*e-g*, 408*i-j*, 410*e-f*, 422*a*, 422*e-f*, 422*i-j*, 424*f*, 430*i-j*, 452*e-f* may be included in the system 400 without deviating from the scope of embodiments described herein. While multiple instances of some components 404*a-j*, 406*b-d*, 408*e-g*, 408*i-j*, 410*e-f*, 422*a*, 422*e-f*, 422*i-j*, 430*i-j*, 452*e-f* are depicted and while single instances of other components 402, 424*f* are depicted, for example, any component 402, 404*a-j*, 406*b-d*, 408*e-g*, 408*i-j*, 410*e-f*, 422*a*, 422*e-f*, 422*i-j*, 424*f*, 430*i-j*, 452*e-f* depicted in the system 400 may comprise a single device, a combination of devices and/or components 402, 404*a-j*, 406*b-d*, 408*e-g*, 408*i-j*, 410*e-f*, 422*a*, 422*e-f*, 422*i-j*, 424*f*, 430*i-j*, 452*e-f*, and/or a plurality of devices, as is or becomes desirable and/or practicable. Similarly, in some embodiments, one or more of the various components 402, 404*a-j*, 406*b-d*, 408*e-g*, 408*i-j*, 410*e-f*, 422*a*, 422*e-f*, 422*i-j*, 424*f*, 430*i-j*, 452*e-f* may not be needed and/or desired in the system 400.

In some embodiments, the user device 402 may be utilized to access one or more of the PP environment 404*e*, the live environment 404*f*, and/or the backend environment 404*h* via the Internet 404*a*. In some embodiments, the user device 402 may be utilized to access the backend environment 404*h* and/or the PP hydra service 430*i* via the PP backend layer 404*i*. A PP backend switch device 422*i* and/or a PP backend firewall device 408*i* may, for example, gate and/or control access to the backend environment 404*h* and/or the PP hydra service 430*i*, via the PP backend layer 404*i*. In some embodiments, the user device 402 may be utilized to access the backend environment 404*h* and/or the live hydra service 430*j* via the live backend layer 404*j*. A live backend switch device 422*j* and/or a live backend firewall device 408*j* may, for example, gate and/or control access to the backend environment 404*h* and/or the live hydra service 430*j*, via the live backend layer 404*j*.

According to some embodiments, any communications (e.g., requests, calls, and/or messages) from the user device 402 may be passed through the DDoS protection layer 404*b*. The DDoS protection layer 404*b* may, for example, monitor and/or facilitate protection against various forms of cyber attacks including, but not limited to, DDoS attacks. In some embodiments, the DDoS protection layer 404*b* may comprise and/or be in communication with a plurality of DDoS router devices 406*b*-1, 406*b*-2, 406*b*-3, 406*b*-4 that may be utilized to route and/or direct incoming communications (e.g., from the user device 402) to appropriate portions of the system 400.

In some embodiments, the DDoS protection layer 404*b* and/or a first DDoS router device 406*b*-1 may route communications from the user device 402 through and/or via a first switch device 422*a*-1 and/or to, through, and/or via a first primary transit provider router device 406*c*-1. In some embodiments, the first switch device 422*a*-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406*c*-1 may, for example, provide access to the PP environment 404*e* and/or the PP server cluster 410*e* thereof, such as via one or more PP firewall devices 408*e*-1, 408*e*-2 and/or one or more PP switch devices 422*e*-1, 422*e*-2. According to some embodiments, the PP switch devices 422*e*-1, 422*e*-2 may comprise content switching devices that process and route data (e.g., in the data link layer) based on data content. In some embodiments, the first primary transit provider router device 406*c*-1 may direct communications to, through, and/or via a PP LAN switch device 422*e*-3 that provides and/or facilitates access to the LAN 404*g*. The LAN 404*g* may, for example, provide private access to and/or between the PP environment 404*e*, the live environment 404*f*, and/or the backend environment 404*h*. In some embodiments, the first primary transit provider router device 406*c*-1 and/or the PP LAN switch device 422*e*-3 may direct communications to, through, and/or via a LAN firewall device 408*g* that provides direct access to either or both of the PP server cluster 410*e* and the live server cluster 410*f*.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410*f* (e.g., via the Internet 404*a*) may conduct (in whole or in part), facilitate, and/or otherwise be associated with execution of one or more stored procedures, applications, processes, and/or methods (e.g., the process 700 of FIG. 7 and/or one or more portions thereof) as described herein. In some embodiments, the user device 402 in conjunction with the live server cluster 410*f* may conduct, or facilitate the execution of procedures, applications and processes that differ between different user devices 402 (not shown explicitly/separately in FIG. 4), creating different gaming experiences for the two users of these devices, even if playing the same game, in the same game session, etc.

Figure 5:
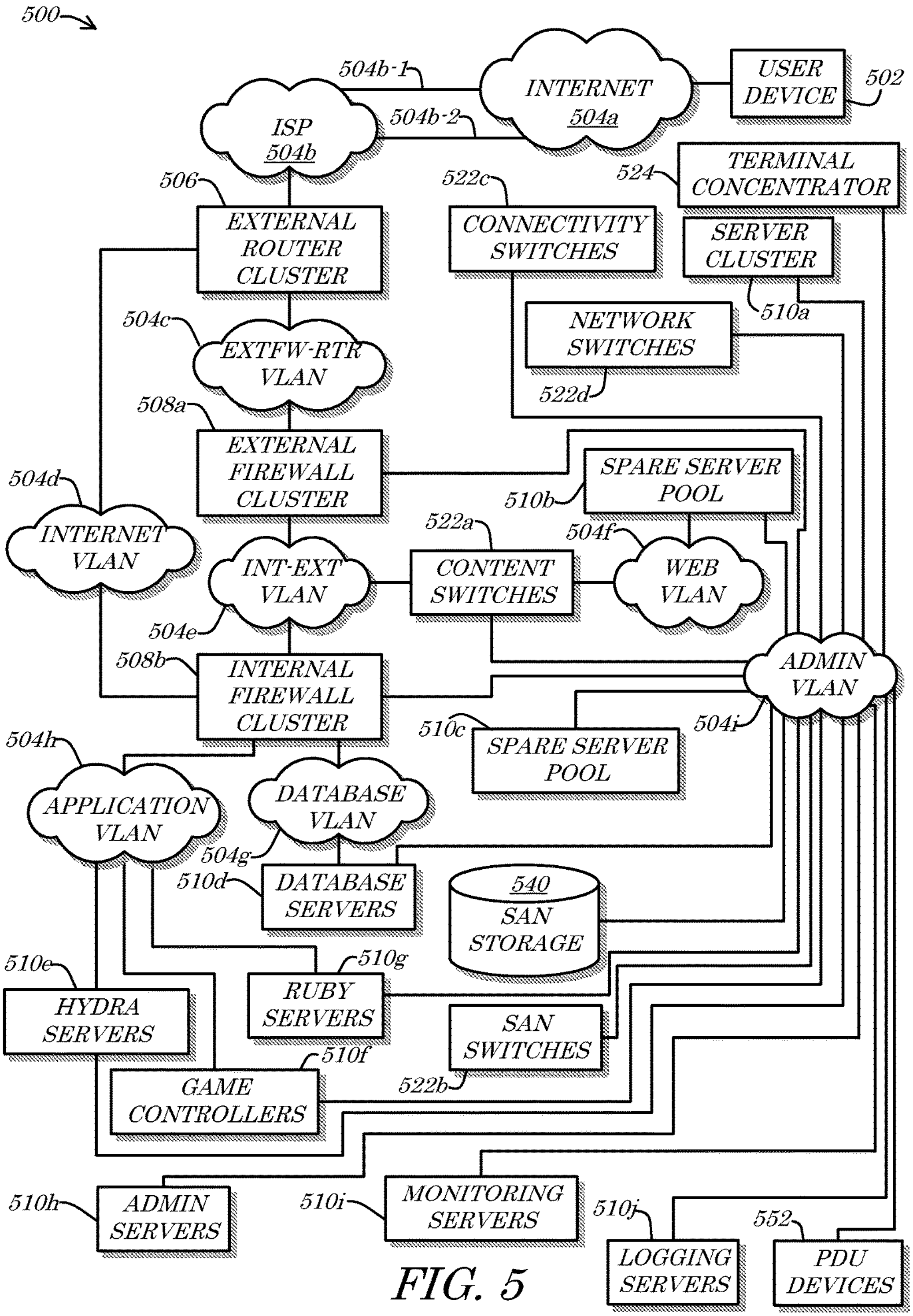
FIG. 5 is a schematic diagram of an embodiment of a gaming platform in accordance with one or more embodiments described herein.

Referring now to FIG. 5, illustrated therein is a block diagram of a system 500 according to some embodiments is shown. In some embodiments, the system 500 may comprise and/or define a "back-end" architecture of a gaming platform such as a platform via which social, multiplayer, and/or online games may be played (e.g., a reel-type slot machine game that includes a special symbol cascade feature as described herein). The system 500 may be utilized in conjunction with the systems 300, 400 if FIG. 3 and/or FIG. 4 herein, for example, and/or may be similar in configuration and/or functionality to the backend environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a*-I, 506, 508*a-b*, 510*a* j, 522*a-d*, 524, 540, 552 of the system 500 may be similar in configuration and/or functionality to any similarly named and/or numbered components described herein. Fewer or more components 502, 504*a*-I, 506, 508*a-b*, 510*a* j, 522*a-d*, 524, 540, 552 (and/or portions thereof) and/or various configurations of the components 502, 504*a*-I, 506, 508*a-b*, 510*a* j, 522*a-d*, 524, 540, 552 may be included in the system 500 without deviating from the scope of embodiments described herein. While multiple instances of some components 504*a*-I, 508*a-b*, 510*a-j*, 522*a-d* are depicted and while single instances of other components 502, 506, 524, 540, 552 are depicted, for example, any component 502, 504*a*-I, 506, 508*a-b*, 510*a* j, 522*a-d*, 524, 540, 552 depicted in the system 500 may comprise a single device, a combination of devices and/or components 502, 504*a*-I, 506, 508*a-b*, 510*a* j, 522*a-d*, 524, 540, 552, and/or a plurality of devices, as is or becomes desirable and/or practicable. Similarly, in some embodiments, one or more of the various components 502, 504*a*-I, 506, 508*a-b*, 510*a* j, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of a game provider and/or other entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches 522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, logic (e.g., logic for determining whether to include special symbols in an outcome or add additional special symbols during a state of a cascade), settings, and/or performance characteristics or preferences for any or all of the servers 510*a* j.

In some embodiments, the server cluster 510*a* may comprise one or more servers and/or other electronic controller devices (e.g., blade servers) configured to provide online gaming data (e.g., interfaces (such as the example interface 800 of FIG. 8A-8E herein), automated game play decisions, outcomes, and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, special symbol decisions (e.g., whether to provide sufficient special symbols for a particular wager such that a bonus feature is triggered for a current game instance), outcomes, results, graphics, sounds, and/or other data or media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or preprogrammed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

According to some embodiments, the user device 502 in conjunction with one or more of the servers 510*a-j* (e.g., via the Internet 504*a*) may conduct (in whole or in part), facilitate, and/or otherwise be associated with execution of one or more stored procedures, applications, processes, and/or methods (e.g., the method 700 of FIG. 7 herein, and/or one or more portions thereof) as described herein. In some embodiments, the user device 502 in conjunction with one or more of the servers 510*a-j* may facilitate the execution of procedures, applications and processes that differ between different user devices 502 (not shown explicitly/separately in FIG. 5), creating different gaming experiences for two players, even if playing the same game, in the same game session, etc.

Example Interfaces

Figure 6:
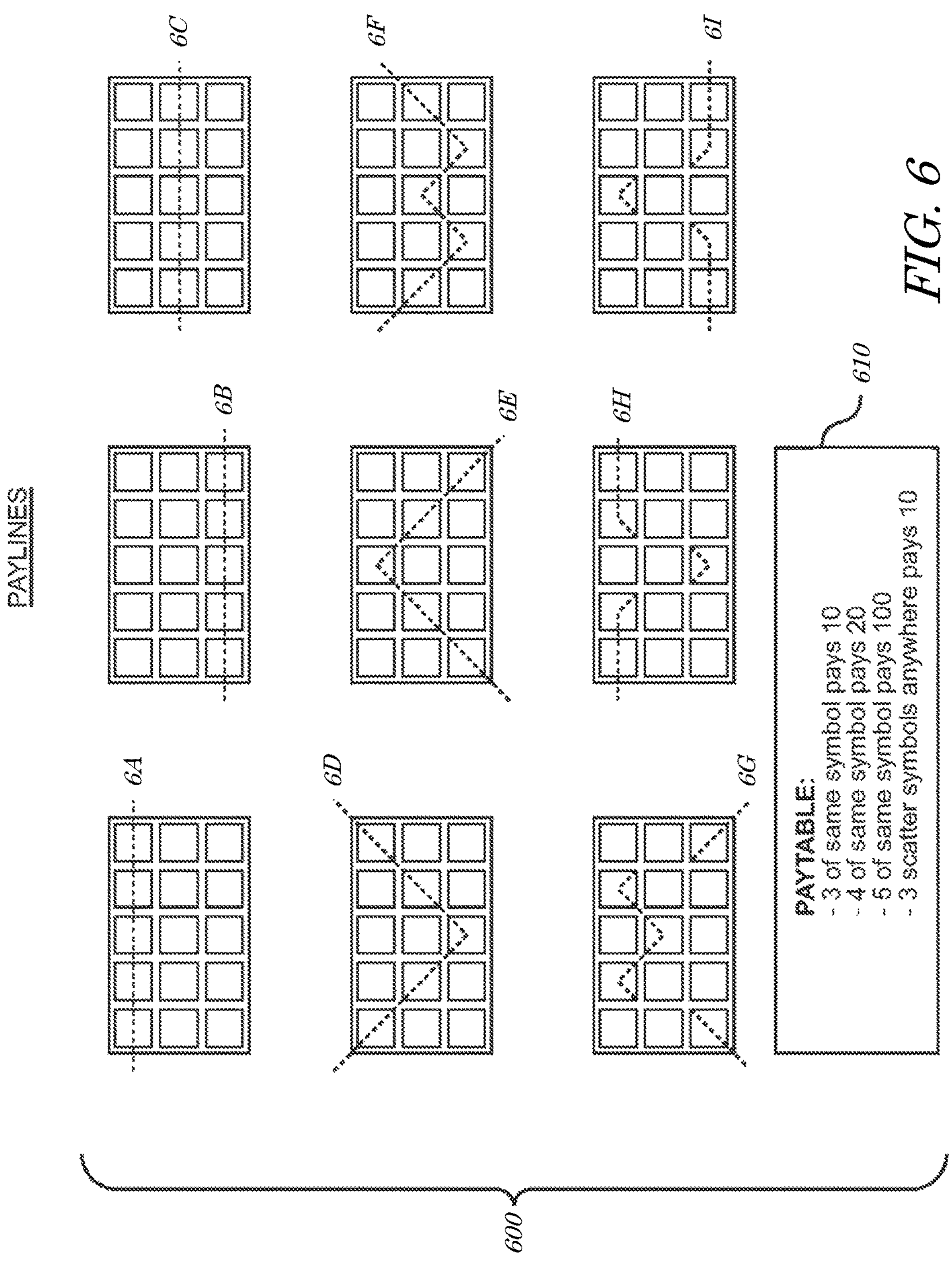
FIG. 6 illustrates one example of a game interface which indicates the available paylines, and the symbol positions comprising such paylines, in a game.

Turning now to FIG. 6, illustrated therein is an example game interface which embodies some embodiments described herein. In particular, FIG. 6 is a representation of the different paylines available in a game and the payout schedule for the game (e.g., winning combinations and the corresponding payout amounts). For example, a screen comprising the information of FIG. 6 (or similar information) may be output to a player who requests to see the paylines and payout schedule for the game. The paylines and payout schedule illustrated in FIG. 6 are utilized in the example embodiment illustrated via FIGS. 8A through 8E and will be referred to herein in the description of a progression of the game depicted in FIGS. 8A through 8E. As illustrated in FIG. 6, there are nine (9) paylines in the game, referred to as paylines 6A, 6B, 6C, 6D, 6E, 6F, 6G, 6H and 6I. The particular symbol positions of a symbol matrix which make up each respective payline are depicted as having a dotted line passing through them.

The game represented in the game interface of FIG. 6 (as well as the game interfaces of FIGS. 8A through 8E) consists of five vertical reels, with each reel having three symbol positions visible to a player of the game. Thus, the game used in FIGS. 6 and 8A-8E may be thought of as having a 3×5 symbol matrix (3 rows and 5 columns (reels)). In accordance with one embodiment, there are nine (9) possible paylines along which a winning combination of symbols may result in a payout or other prize being awarded to a player. Of course any number of reels, number of symbol positions on each reel or paylines may be utilized and the embodiments described herein are not dependent on any particular number or configuration of reels, symbol positions in a symbol matrix or number or configuration of paylines.

Although a reel-based slot machine-type game is used here to illustrate some embodiments, the embodiments are not limited to such an implementation. Many of the embodiments described herein may be applied to any game interface which includes symbols placed into symbol positions and a determination of whether a player qualifies for a prize based on whether the symbols located in a predetermined set or pattern of the symbol positions include a winning combination of symbols. For example, in a multi-hand card game in which a plurality of hands (e.g., a hand being a set of five cards) are arranged in rows of a symbol matrix, one embodiment may comprise replacing each card removed from a particular card position (e.g., each first card of each hand, each second card of each hand, etc.) with another card, such as the card in the card position immediately above the card position from which the card has been removed. Other examples of different types of games to which the special symbol removal and cascade mechanic described herein may be applied include, without limitation, bingo and keno.

For purposes of describing some embodiments, in the reel game interface of FIG. 6 and FIGS. 8A through 8E, the top visible symbol position of a given reel is referred to as position "0" herein, the middle visible symbol position of a given reel is referred to as position "1" herein and the bottom visible symbol position is referred to as position "2" herein. Thus, for example, payline 6A in FIG. 6 consists of position "0" on each of the five reels; payline 6B consists of position "2" on each of the five reels and payline 6C consists of position "1" on each of the five reels.

The example game depicted in FIGS. 6 and 8A through 8E is an "A-B-C-D" themed game in which the regular symbols are "A", "B", "C" and "D" and a special symbol comprising a scatter symbol is depicted as a star. Area 610 of FIG. 6 indicates which combinations of symbols are considered winning combinations and the corresponding payout for each winning combination. For purposes of brevity, only a simplistic model of winning combinations is illustrated: (i) three (3) of the same regular symbol (or a combination of the same regular symbol and one or more wild symbols)) along a given payline will result in a payout or award of ten (10) credits being provided to the player (e.g., added to a credit meter balance associated with the player; (ii) four (4) of the same regular symbol (or a combination of the same regular symbol and one or more wild symbols) along a given payline will result in a payout of twenty (20) credits being provided to the player; (iii) five (5) of the same regular symbol (or a combination of the same regular symbol and one or more wild symbols) will result in a payout of one-hundred (100) credits being provided to the player; and (iv) three (3) scatter symbols in any of the symbol positions (i.e., not necessarily along any of the available paylines) will result in a payout of ten (10) credits being provided to the player. The payline configurations 6A through 6I and payout table 610 will be referred to in the descriptions of FIGS. 8A through 8E.

Figure 7:
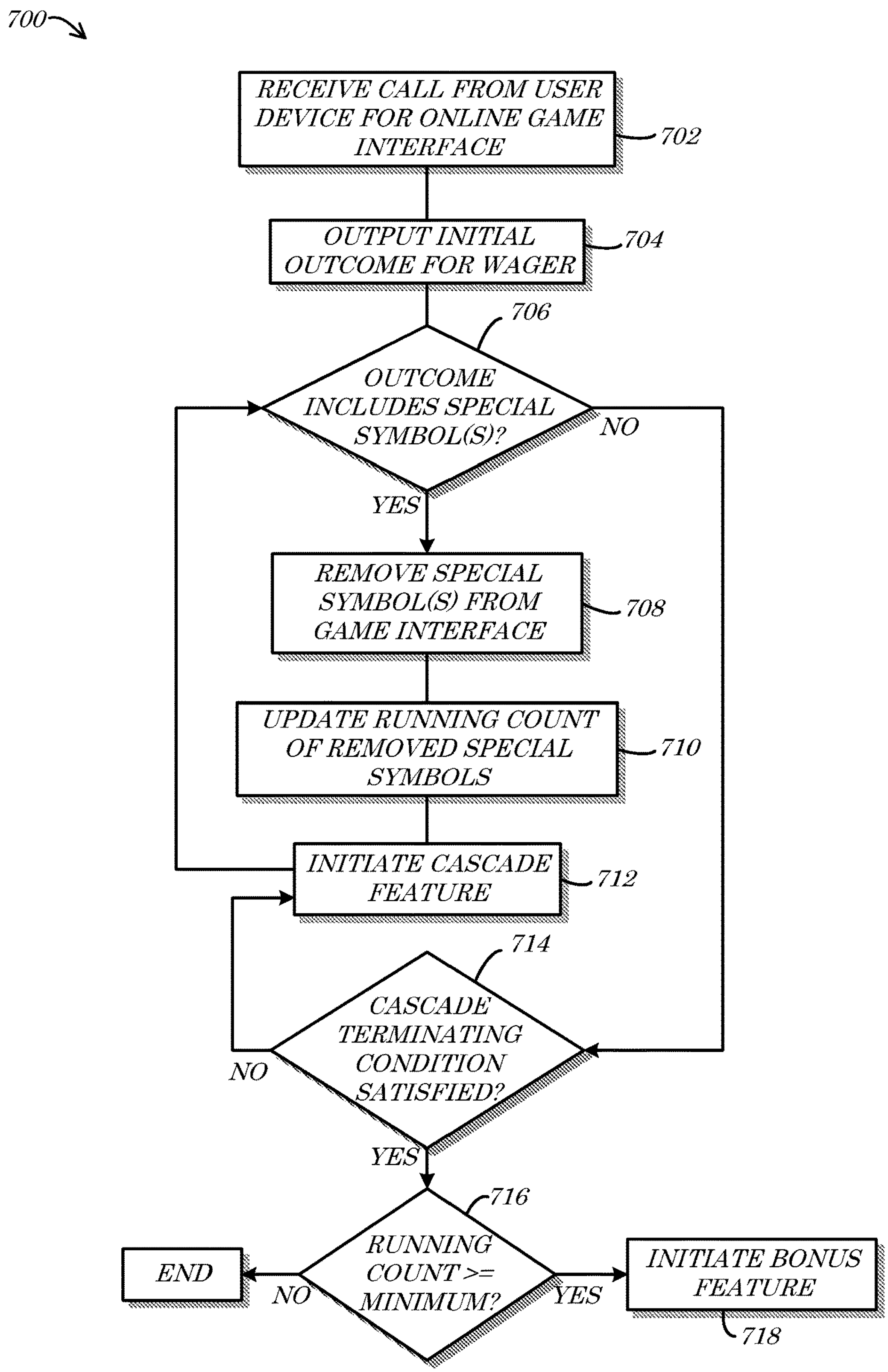
FIG. 7 is a flow diagram of an example process consistent with one or more embodiments described herein.

Referring now to FIG. 7, illustrated therein is a flow diagram of an example process 700 that is consistent with some embodiments described herein. It should be noted that additional and/or different steps may be added to those depicted and that not all steps depicted are necessary to any embodiment described herein. Process 700 is each an example process of how some embodiments described herein may be implemented and should not be taken in a limiting fashion. A person of ordinary skill in the art, upon contemplation of the embodiments described herein, may make various modifications to process 700 without departing from the spirit and scope of the embodiments in the possession of applicant.

The process 700 may be a stand-alone program or may be part of a program, or set of programs providing other services or functionality. For example, a server device or mobile device may be executing a game program and within that program a process 700 may comprise a section or module that is executed at a relevant time. Similarly, the process 700 may be provided as a stand-alone program which is called by the game program when required such that process 700 can be used by multiple programs. For example, it is common for software providers to use a single "game engine" program to provide core services which are utilized by a number of individual game programs to save duplication of software code. The program which executes the process 700 as a subroutine or module may, in accordance with some embodiments, be downloaded or accessed via a game provider. For example, it may be accessed from a remote server of a game provider via a web browser of the mobile device or may be downloaded to the mobile device from the remote server.

As described herein, in accordance with some embodiments a software application or program may be downloaded and/or installed onto a computing device (e.g., a user computing device such as a mobile device or server device), for facilitating one or more functions, programs or processes described herein. Such a software application or program may further comprise one or more software module(s) for directing a processor of the player device to perform certain functions. In accordance with some embodiments, software components, applications, routines or sub-routines, or sets of instructions for causing one or more processors to perform certain functions may be referred to as "modules". It should be noted that such modules, or any software or computer program referred to herein, may be written in any computer language and may be a portion of a monolithic code base, or may be developed in more discrete code portions, such as is typical in object-oriented computer languages. In addition, the modules, or any software or computer program referred to herein, may in some embodiments be distributed across a plurality of computer platforms, servers, terminals, and the like. For example, a given module may be implemented such that the described functions are performed by separate processors and/or computing hardware platforms.

It should be understood that any of the software module(s) or computer programs described herein may be part of a single program or integrated into various programs for controlling a processor of a computing device. Further, any of the software module(s) or computer programs described herein may be stored in a compressed, uncompiled, and/or encrypted format and include instructions which, when performed by a processor, cause the processor to operate in accordance with at least some of the methods described herein. Of course, additional and/or different software module(s) or computer programs may be included and it should be understood that the example software module(s) described herein are not necessary in any embodiments. Use of the term "module" is not intended to imply that the functionality described with reference thereto is embodied as a stand-alone or independently functioning program or application. While in some embodiments functionality described with respect to a particular module may be independently functioning, in other embodiments such functionality is described with reference to a particular module for ease or convenience of description only and such functionality may in fact be a part of integrated into another module, program, application, or set of instructions for directing a processor of a computing device.

According to some embodiments, the instructions of any or all of the software module(s) or programs described herein may be read into a main memory from another computer-readable medium, such from a ROM to RAM. Execution of sequences of the instructions in the software module(s) or programs may cause a processor to perform at least some of the process steps described herein. In alternate embodiments, hard-wired circuitry may be used in place of, or in combination with, software instructions for implementation of the processes of the embodiments described herein. Thus, the embodiments described herein are not limited to any specific combination of hardware and software.

Process 700 will be described at times with illustrative references to FIGS. 8A-8E. Accordingly, the present description will be first diverted to a description of FIG. 8A and the elements of the example interface that are repeated in FIGS. 8A-8E.

Figure 8A:
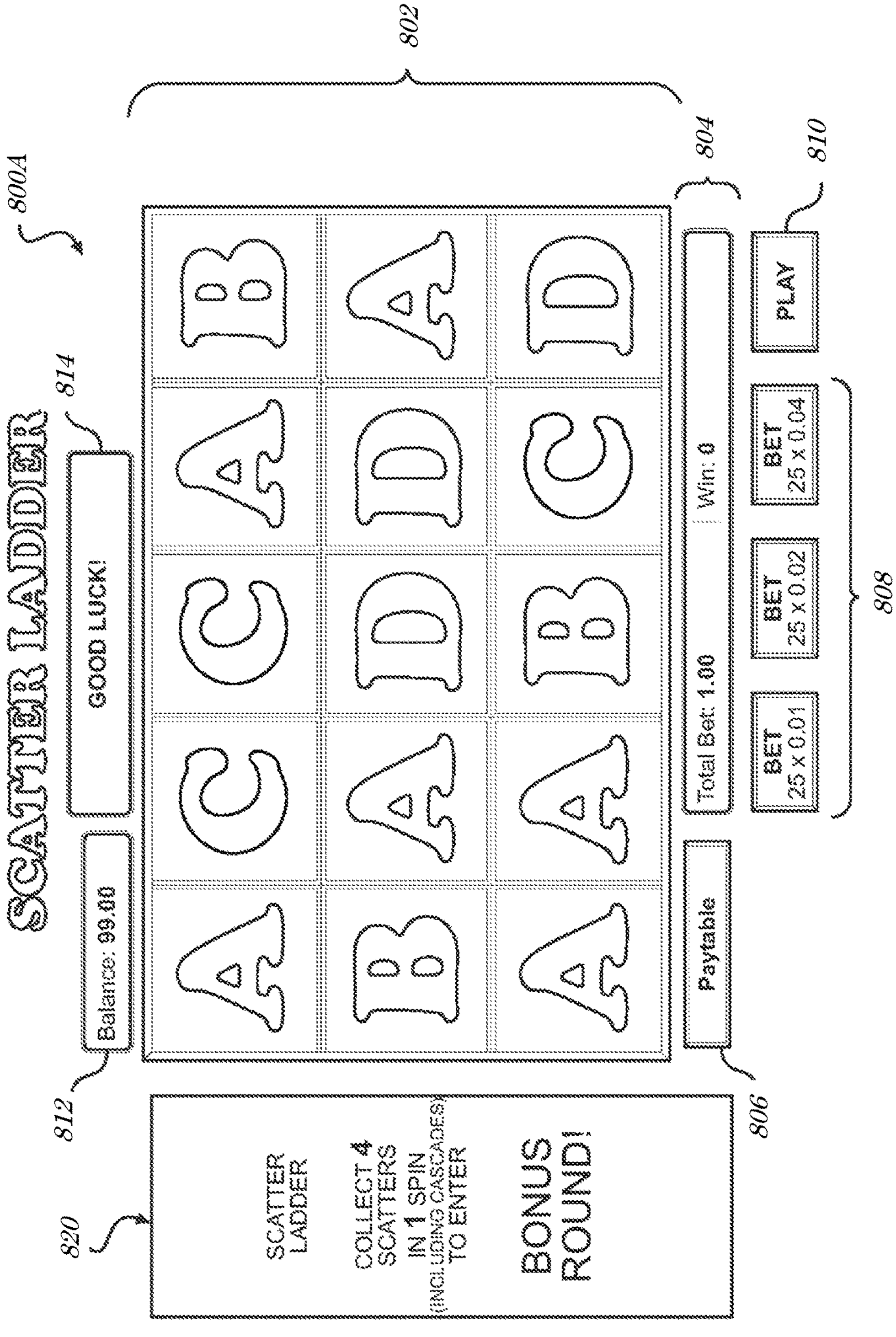
FIGS. 8A through 8E together illustrate one example embodiment of a state of a game interface (e.g., an online game interface), as it is modified over the course of multiple events in the game, in a manner consistent with one or more embodiments described herein.

Turning now to FIG. 8A, illustrated therein is an example of a game interface 800A as it may be output to a player who is initiating a game session or about to initiate a new game event (e.g., a new spin) for the game. In particular, FIG. 8A is an illustration of a screen shot which shows a "snapshot in time" of a current status of a game event, such as it may appear to a player who has just placed a bet, actuated a spin or play mechanism and been shown the result of the spin (e.g., the bet placed, the symbols comprising the outcome, any payout won as a result of the outcome). In the example of FIG. 8A, the player has not won anything as a result of the spin because the symbols placed in the symbol positions do not comprise any winning combinations of symbols. For purposes of illustrating some example embodiments, it may be assumed that a maximum bet of 1.00 causes each of the available nine (9) paylines to be active (i.e., to be evaluated for the presence of a winning combination of symbols and for a corresponding payout to be awarded to the player if such a winning combination is found) and that the nine (9) available paylines are the ones illustrated in FIG. 6.

The game interface 800A includes a plurality of areas for outputting information to a player. The areas include area 802, which is the symbol matrix comprising a plurality of symbol positions arranged in a configuration of five (5) columns (e.g., reels) and three (3) rows. Each intersection of a row and column comprises a unique symbol position (e.g., reel position "0" of the first reel on the left is a symbol position which in FIG. 8A has the symbol "A" placed therein while reel symbol position "1" of the first reel on the left is a symbol position which in FIG. 8A has the symbol "B" placed therein). Area 804 of the screen interface outputs to the player (i) the total bet or wager being placed on the current game event; and (ii) the total win or payout won by the player as a result of the game event. In the example of FIG. 8A, it is shown that a total bet of 1.00 (e.g., credits, dollars or another currency) has been placed on the current game event and that the player has not yet won anything as a result of the game event. A comparison to the paylines being utilized in the current game, illustrated in FIG. 6, shows that none of the paylines comprise three (3) or more of the same regular symbol as a result of the game event. Area 806 of the game interface 800A, if actuated or selected by the player, will cause a paytable and/or other information explaining the rules or mechanics of the game to be displayed to the player (e.g., via a new screen or pop-up window). For example, a selection of area 806 by a player may cause a screen similar to that depicted in FIG. 6 to be output to the player, informing the player of the paylines and payout schedule of the game.

The symbols to be output in the area 802 for a game event may, in some embodiments, be determined based on a random or pseudo-random process (or a two stage process as described above). For example, an RNG may be used to determine a random number which may then be used to determine the symbols to output in area 502. The RNG may be stored in, for example, a game server (e.g., game server 110 of FIG. 1), another server device in communication with a player device on which the game is being played or the player device itself. In some embodiments, the initiation of an event instance (e.g., a game event such as an initiation of a spin) or other request for an outcome of the game may cause the player device to request the outcome (or an RNG based upon which an outcome may be determined) from another device such as a game server (e.g., game server 110 of FIG. 1). Thus, in some embodiments when a player places a wager and initiates a game event (e.g., by actuating or selecting the "play" button or area 810, which may cause an outcome for the game event to be determined (e.g., a determination of which symbol should be placed in each symbol position of the game matrix)) by at least one of the player device and a remote server device, based on an RNG process or another process.

Area 808 includes a selection of different bet amounts which a player may select for a given game event. For example, the player may choose to bet 0.25 (i.e., 25×0.01), 0.50 (i.e., 25×0.02), or 1.00 (i.e., 25×0.04). Of course, additional or different bet amounts may be used and the embodiments described herein are not limited to any particular bet amount or number of bet amounts.

Area 812 indicates to the player the current amount of the player's credit balance. In the current example, the player has 99.00 credits available for wagering from the credit balance. A bet the player places may be deduced from the credit balance shown in area 812 and any payouts won by the player may be added to the credit balance shown in area 812. Area 814 is an area for dynamically outputting messages to the player (e.g., messages of encouragement, status information and/or an explanation of a game event).

Area 820 informs a player of the condition which must be satisfied in order for a bonus feature to be activated. In the present example, this condition is that four (4) scatter symbols must be placed in symbol positions and removed therefrom during a span of an initial spin and any cascades which may be triggered from an outcome of such initial spin. The removed scatter symbols may be added to a running count, which may be depicted in area 820.

In the present application, like reference numerals in the Figures refer to like elements. Thus, for example, in the FIGS. 8A through 8E (which show a progression of game over the course of an initial spin and subsequent game events such as cascades), area 802 is repeated (although it may be shown to output different symbols in the symbol positions of the game matrix, based on an outcome of a spin or replacement of symbols). Similarly, areas 804, 806, 808, 810 and 812 are also repeated, although the information or data shown in them may change (e.g., the credit balance shown in area 812 is adjusted based on game events).

It should be noted that additional information may be output to the player via the interface illustrated in FIGS. 8A through 8E, which additional information is omitted herein for purposes of brevity. For example, player history or preferences, information about other games the player is participating in, recommendations or tips for betting, etc. may be show for one or more players.

Returning now to FIG. 7 and process 700, in accordance with one embodiment a call from a user device for an online game interface may be received (702). This step may, in some embodiments, be preceded with a step of outputting an opportunity for the online game (e.g., via a website of an online game provider) to one or more players.

Step 702 may comprise at least one of (i) determining a unique identifier of a player who would like to play the online game; (ii) determining an identifier or address of a player device via which the player is playing the game; (iii) determining an wager amount for a bet that is being placed on the online game, as well as any other values for other player-selectable parameters of the wager (e.g., paylines the player may have selected as active paylines, if that is an available option in the game); and (iv) updating a database or other memory device to indicate information about the wager and/or player's session.

In step 704, the initial outcome for the wager associated with step 702 is output. The term "initial outcome" is used because, in accordance with some embodiments described herein, the outcome determined and output based on a wager and request for an outcome from a user device, an outcome may be output that includes certain symbols (e.g., special symbols and/or regular symbols) that trigger one or more cascades. Thus, the initial outcome is the first outcome determined and output for a wager, prior to any cascades having been initiated. Prior to outputting the initial outcome, the initial outcome may first be received or determined. In some embodiments, the initial outcome may be received from another device or determined based on data received from another device. For example, a random or pseudo-random number, output or data from an RNG or other algorithm may be requested and received and the initial outcome may be determined based on this output or data.

In some embodiments, the initial outcome may be determined (or partially determined) but not immediately output to the player. For example, the initial outcome may, in some embodiments, be based on both first data from a first source (e.g., a first process or algorithm applied by a RNG) and second data from a second source (e.g., a second process applied by a module or device and for determining whether (or how many) special symbols to include in the initial outcome and/or which symbol positions of the online game interface to place any such special symbols). The first data and second data may then be combined in order to generate the initial outcome (by the apparatus performing process 700 or another apparatus). Once the initial outcome is generated or determined, it is output via an online game interface (e.g., an interface such as that illustrated in screen shot 800B of FIG. 8B) to a player (e.g., via a web browser of a player device).

In some embodiments, step 704 or another step of process 700 or another process may further include evaluating the initial outcome and/or the paylines (or active paylines, in some embodiments) of the online game interface to determine whether the initial outcome includes any winning combinations of symbols and whether the player qualifies for a payout or other prize as a result of the initial outcome. Additionally, step 704 or another step of process 700 or another process may include updating a credit balance to add any payouts the player has won as a result of the initial outcome or otherwise providing a prize to the player if appropriate.

Figure 8B:
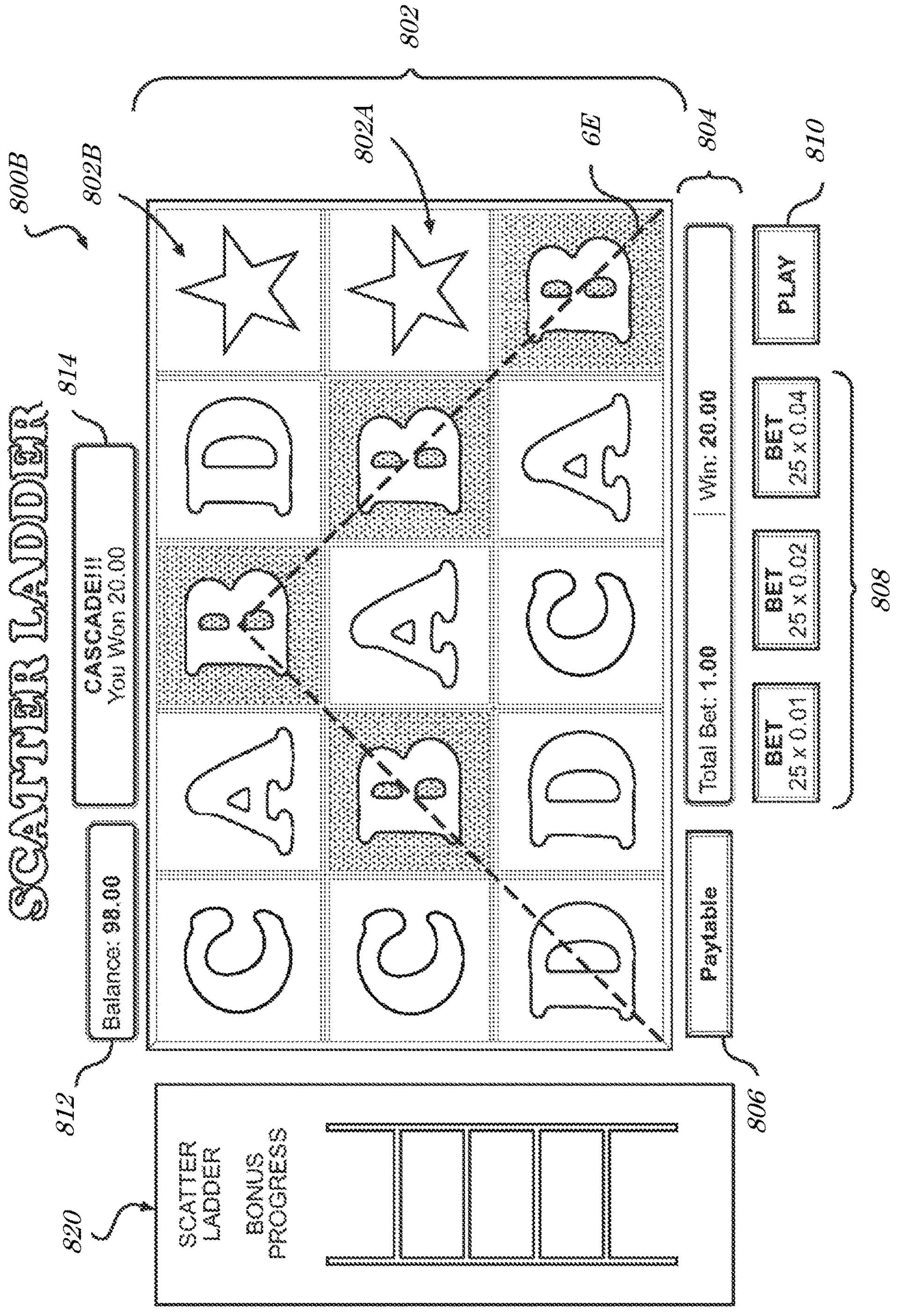

Turning now to FIG. 8B, screen shot 800B (which shows the progress in the game of a player since that shown in FIG. 8A) illustrates how the performance of steps 702 and 704 may impact information that is output to a player via an online game interface or how a state of an online game interface may be modified in accordance with steps 702 and 704 or in accordance with similar steps in a different process. In particular, screen shot 800B indicates that the player has placed another 1.00 bet (as indicated in area 804) and has won, as a result of the game event for which the bet was placed (the spin of the reels in this example) a total payout of 20.00 (which has not yet been added to the player's credit balance but is indicated to the player in area 814). The 20.00 may be referred to as a result or payout for the initial outcome of the 1.00 wager that is output to the player in screen shot 800B. The credit meter balance in area 812 illustrates the change in credit balance (from the 99.00 shown in FIG. 8A) as a result of the 1.00 bet being deducted, bringing the credit meter balance to 98.00. The 20.00 total win for the game event comprising the spin initiated by the player's bet is derived as follows (with reference to the paylines and payout table of FIG. 6): 20.00 was won based on the presence of four (4) "B" symbols along payline 6E. It should be noted that each of the "B" symbols along payline 6E are emphasized in FIG. 8B by means of darker shading in the background of each of the symbol positions in which these symbols appear. While a change in the background of the symbol position of a symbol which is to be removed from the game interface is not a requirement of any embodiment, the highlighting is utilized in FIGS. 8A through 8E is intended to help identify, for the convenience of the reader, the symbols which are part of a winning combination and are thus to be removed from the game interface via a cascade features in accordance with some embodiments. The symbols (regular symbols and special symbols) illustrated in screen shot 800B are the initial outcome for the current wager placed by the player.

Returning again to process 700, in step 706 it is determined whether the most current outcome (whether it be the initial outcome, if the process is flowing from step 704, or an outcome resulting from a cascade, if the process 700 is flowing from step 712, as is described herein) includes any special symbol(s). In some embodiments in which only special symbols that satisfy a qualifying condition qualify for removal and towards a running count of special symbols that may trigger a bonus feature, step 706 may comprise determining whether the outcome includes any special qualifying symbols (e.g., special symbols that are placed along an active payline, a winning payline or in a designated symbol position). Step 706 may be performed, in some embodiments, prior to or simultaneously with the initial outcome being output via the online game interface. For example, whether the initial outcome includes any special symbols may be determined based on second data that is received (the second data indicating whether any special symbols are to be included in the initial outcome) and used to generate the initial outcome. In some embodiments, the determination of whether the initial outcome includes any special symbols may be performed during an evaluation of the paylines and/or initial outcome to determine whether the player qualifies for a payout or other prize as a result of the initial outcome.

Turning to the example of FIG. 8B, screen shot 800B illustrates that two (2) scatter symbols 802A and 802B are included in the initial outcome output in the symbol matrix comprising area 802. In accordance with some embodiments, a special symbol such as a scatter symbol need not be along a payline, a winning payline and/or an active payline in order to be eligible towards a running count of special symbols that may cause a bonus feature to be triggered if the running count reaches a specified or minimum value.

In accordance with some embodiments, the presence of scatter symbols or the presence of a winning combination of symbols may trigger a cascade (in other embodiments only one of these conditions (presence of scatter symbols or presence of a winning combination) may trigger a cascade. The player is informed of the magnitude of the payout won and the triggering of a cascade in area 814 of FIG. 8B.

Area 820 indicates a current status of a running count of special symbols (scatter symbols for purposes of the present example) which must be removed from the symbol matrix and collected or counted in order or a bonus feature to be activated. In the illustrative example of FIGS. 8A-8E, the running count of the scatter symbols is illustrated as a ladder with four (4) rungs, wherein a single scatter symbol must be collected and placed on each rung in order for the bonus feature to be activated. The embodiments described herein are not dependent on any particular manner of illustrating the running count of collected special symbols and many suitable mechanisms for depicting a current status of a running count of collected special symbols may be utilized without departing from the spirit and scope of the embodiments described herein. The two scatter symbols 802A and 802B have not yet been removed from the symbol matrix 802 and are thus not yet indicated, in area 820, as having been collected.

Returning to process 700, if it is determined that the most recently determined outcome does not include any special symbols, then the process proceeds to step 714. In step 714 it is determined whether a cascade terminating condition has been satisfied (if a cascade has previously been initiated for the current wager or game instance). In a scenario where no cascade was triggered by an initial outcome of a game instance (e.g., based on a removal of special symbols and/or regular symbols from the symbol matrix), the process 700 may, in some embodiments, end after step 706. If, on the other hand, it is determined that the symbol matrix does include at least one special symbol, the process 700 continues to step 708 in which step the special symbol(s) are removed from the online game interface. In some embodiments, additional symbols (e.g., regular symbols that are part of a winning combination and/or along a winning and active payline or regular symbols that are qualifying winning symbols) may also be removed from the symbol matrix along with the special symbol(s). In some embodiments such additional symbols may be removed from the symbol matrix (and, for example, a cascade triggered) even if the most recently determined outcome does not include any special symbols.

In step 710, the running count of the removed special symbols is updated. For example, the value of the running count is modified to add the number of removed special symbols to the previous value of the running count. The running count may be updated in a memory that stores a current state of the current game instance and/or in a database. The online game interface may also be updated to reflect the updated value of the running count.

Once the appropriate symbols have been removed (e.g., the special symbols that qualify to be added to the running count and any qualifying regular symbols, such as regular symbols that comprise qualifying symbols of a winning combination of symbols), a cascade feature may be initiated that causes symbols above the symbol positions which have been vacated as a result of the removal are dropped down to fill the vacant positions, the symbols above the symbols which have dropped down are also dropped down by one position, etc. until all symbol positions of the symbol matrix are once again populated by game symbols. The cascade feature may be output as an animation feature that displays an animation of the reels and the symbols moving downward along a respective reel to fill vacant positions and new symbols appearing along the top reel positions if appropriate. The cascade feature is initiated in step 712 of process 700.

Figure 8C:
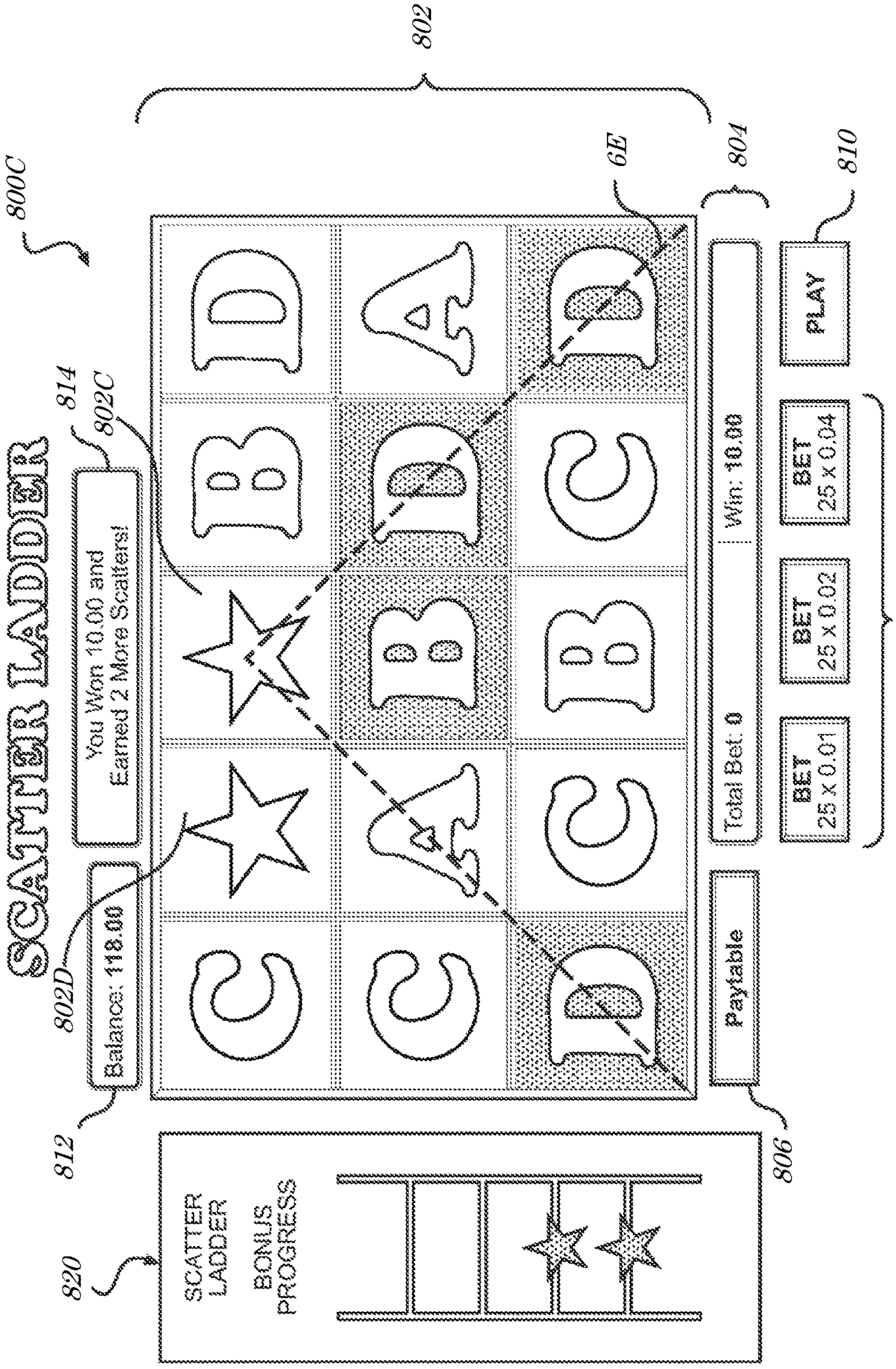

Turning to FIG. 8C, illustrated therein is an implementation of a cascade feature as applied to the outcome depicted in FIG. 8B. FIG. 8C illustrates one implementation of steps 708-712 of process 700. In particular, screen shot 800C (which shows the progress in the game of the player since that shown in FIG. 8B) illustrates that the “B” symbols which were each part of a winning combination of symbols along payline 6E (as illustrated in FIG. 8B) and the scatter symbols 802A and 802B have been removed from the symbol matrix 802 and the 20.00 in credits has been added to the player’s credit meter balance (as shown in area 812). The removed symbols have been removed from the following symbol positions: (i) position “0” of the third reel and the fifth reel; (ii) position “1” of the second reel, the fourth reel and the fifth reel; and (iii) position “2” of the fifth reel.

The symbols which were removed and replaced (the four (4) “B” symbols and the two (2) scatter symbols 802A and 802B) were replaced by the symbol located immediately above them in the symbol matrix, if there was a symbol above the symbol in the visible symbol matrix. Thus, for example, the “B” symbol removed from position “1” of the fourth reel was replaced by the "D" symbol which dropped down from the "0" position of the same reel and the "B" symbol removed from position "1" of the second reel was replaced by the "A" symbol which dropped down from the "0" position of the same reel.

The "B" and scatter symbols which were removed but which did not have another symbol visible above them in the symbol matrix (the "B" symbol in the "0" position of the third reel and scatter symbols 802A and 802B) may be replaced in a variety of manners. For example, in one embodiment a replacement symbol may be determined based on a random or pseudo-random process (e.g., based on a new output received from an RNG). In another example, there may be a symbol which had previously been determined as being located above the symbols being removed from the "0" positions of the reels but such symbols may not have been visible to the player (i.e., may be on the reel but on a portion of the reel that is not part of the visible reel matrix) or had otherwise been previously determined as available for replacing symbols in such symbol positions. The embodiments described herein are not dependent on any particular manner in which another regular symbol is determined for replacing a removed symbol.

As illustrated in area 820 of FIG. 8C, the two removed scatter symbols 802A and 802B (which were illustrated in FIG. 8B within symbol positions of symbol matrix 802) have been added to the running count of scatter symbols collected during a particular game instance (e.g., as result of an initial outcome and any subsequent cascades). Thus, the player has obtained during the present game instance two (2) of the four (4) scatter symbols that need to be collected prior to a termination of cascades for the current game event in order for a bonus feature to be activated.

As further illustrated in area 804 of FIG. 8C, a wager has not been deducted from the credit balance for the cascade feature being effectuated in FIG. 8C (but the 20.00 credits won as a result of the initial outcome of the spin, as illustrated in FIG. 8B, have been now added to the credit meter balance). In accordance with one embodiment, a cascade feature is a free bonus awarded to a player and does not require an additional wager to be deducted from a player's credit balance. In other embodiments, a wager may be deducted for a cascade (in such latter embodiments a player may be provided with an option to accept or reject the cascade and thus agree to the wager).

As a result of the cascade feature applied in FIG. 8C and the replacement symbols being position in the symbol matrix of area 802, the player has won a total of 10.00 additional credits and two (2) additional scatter symbols 802C and 802D were placed in the symbol matrix 802. These results are indicated to the player in area 814 of FIG. 8C. The 10.00 total win for the game event comprising the reel cascade (with reference to the paylines and payout table of FIG. 6) was due to the presence of three "D" symbols along payline 6E.

In accordance with some embodiments, the cascade feature is an on-going game mechanic such that if a cascade-triggering condition is satisfied by the symbols placed in the symbol matrix as a result of a cascade (e.g., additional winning combination(s) are created as a result of a cascade and/or at least one additional special symbol is placed as a result of a cascade), another cascade is triggered. The game illustrated in FIGS. 8A through 8E employs such an on-going cascade mechanic. Thus, because additional winning combinations were created as a result of the cascade outcome illustrated in FIG. 8C (a winning combination of three (3) "D" symbols along payline 6E was created and two additional scatter symbols 802C and 802D were placed), a second cascade is triggered.

Returning to process 700, once a cascade has been performed and the symbols moved into vacated positions of the symbol matrix, it is once again determined whether the most recently determined outcome (the outcome generated as a result of the cascade, for purposes of the present example) includes any special symbols (step 706). As described above with respect to step 706, step 706 (or another step of process 700 or another process) may include an evaluation of the paylines (or active paylines, if appropriate based on the implementation of the game) to determine whether the player qualifies for a payout as a result of the outcome generated based on the cascade and/or providing any such payout to the player. The process 700 the repeats steps 708-712 (which will not be described again for purposes of brevity).

Figure 8D:
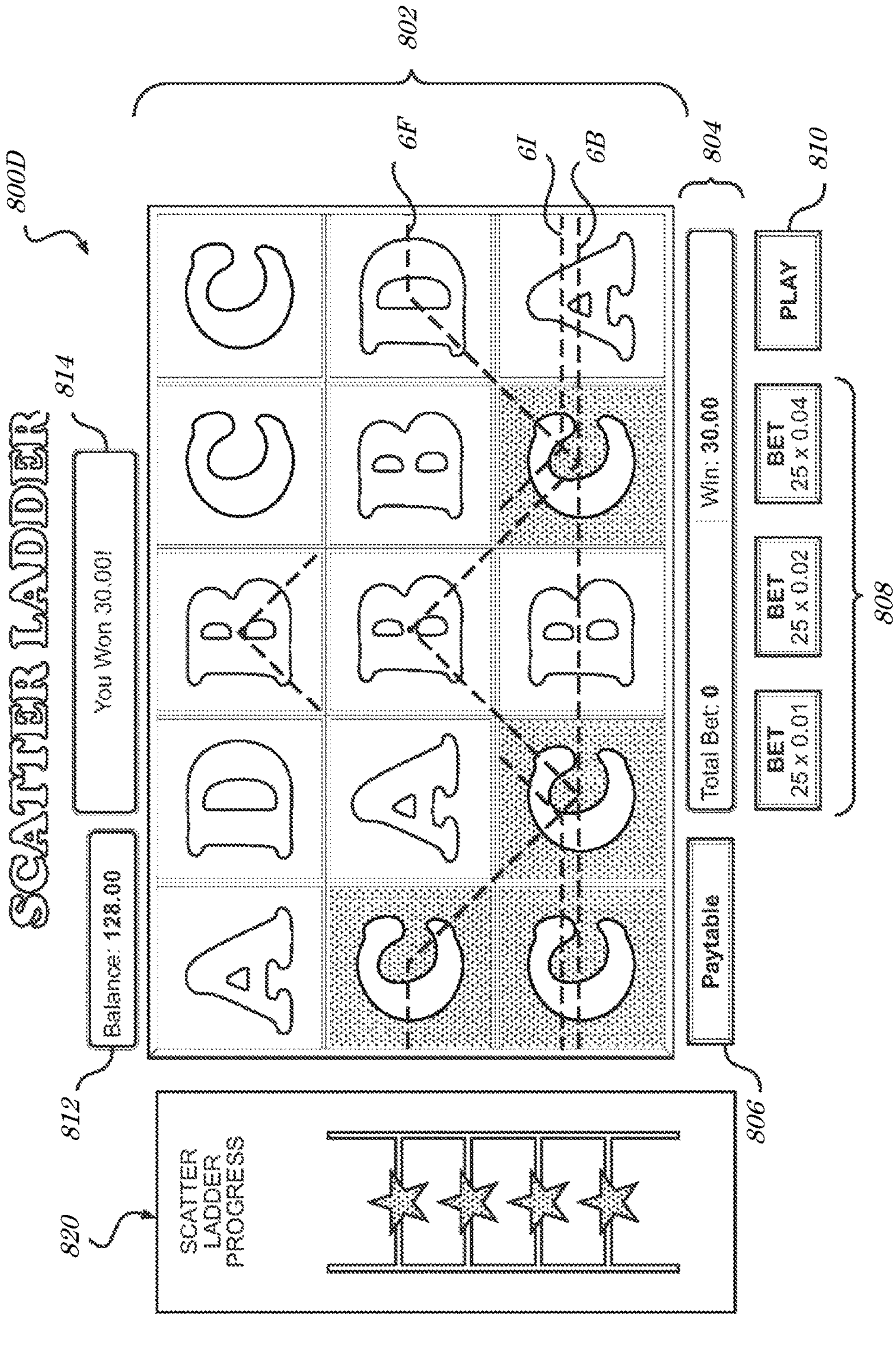

Turning now to FIG. 8D, screen shot 800D shows the progress in the game of the player since that shown in FIG. 8C, once the results of the first cascade have been applied and a second reel cascade has been performed. The screen shot 800D illustrates the outcome which resulted from the removal and replacement of the three "D" symbols along payline 6E and the two scatter symbols 802C and 802D. In particular, while no additional scatter symbols have been placed, new winning combinations of symbols have been created as follows: (i) three (3) "C" symbols have been placed along payline 6B, resulting in an additional win of 10.00 credits; (ii) three (3) "C" symbols have been placed along payline 6F, resulting in an additional win of 10.00 credits; and (iii) three (3) "C" symbols have been placed along payline 6I, resulting in yet another additional win of 10.00 credits. Thus, the player has won a total of 30.00 additional credits as a result of the second cascade (as indicated to the player in area 814 of FIG. 8D).

The credit meter balance (shown in area 812) is illustrated as currently being 128.00, with the additional win of 10.00 credits won as a result of the first cascade having been added thereto, but the 30.00 credits won as a result of the second cascade not yet added thereto.

The two scatter symbols 802C and 802D, which were removed from the symbol matrix 802 during the cascade, are illustrated as having been added to the running count of scatter symbols illustrated in area 820.

In accordance with some embodiments, a bonus round may immediately be triggered (and no additional cascades may be allowed, even if a new winning combination of symbols was created as a result of the immediately preceding cascade) if a result of the cascade is an obtainment of a sufficient number of symbols to qualify the player for the corresponding bonus feature. Thus, in such embodiments the bonus feature may have been initiated upon the two scatter symbols 802C and 802D having been placed in the symbol matrix 802 (as illustrated in FIG. 8C) and the second cascade may not have been initiated.

In some embodiments, a bonus feature may be initiated upon the removal of placed special symbols from the symbol matrix during a cascade (and addition of such special symbols to a running count, as illustrated in area 820 of FIG. 8D). In such an embodiment, even though additional winning combinations of symbols have been created as a result of the second cascade along paylines 6B, 6F and 6I, these symbols may not be removed and a third cascade may not be triggered. Rather, the player may be awarded the 30.00 credits resulting from the second cascade and the game may then go into the bonus feature.

However, in some embodiments the cascades may continue to be triggered until no further winning combinations of symbols are created as a result of a cascade. This latter embodiment is illustrated in the example of FIGS. 8A-8E and applied in process 700. Thus, in process 700 the process continuous to loop through steps 706-714 until it is determined that a cascade terminating condition has been satisfied. Examples of terminating conditions include, without limitation: (i) no additional special symbols are placed in any symbol positions as a result of a cascade; (ii) a sufficient number of special symbols are removed and added to the bonus qualification count to trigger the bonus feature; (iii) no symbols (regular or special) are removed after a cascade (e.g., because no additional special symbols were added to the symbol matrix and no additional winning combinations of symbols were created as a result of the last cascade); (iv) a maximum number of cascades has been triggered; and (v) the cascade feature has been active for a maximum amount of time.

It should be noted that, in some embodiments, a probability table may be used to determine whether to place special symbols into a symbol matrix to generate an outcome (whether it be an initial outcome or an outcome created as a result of a cascade). In accordance with some embodiments, the probability of a special symbol being included in an outcome may decrease as the number of cascades triggered as a result of an initial outcome increases (e.g., there is a probability X of two special symbols being placed into the symbol matrix for the initial outcome and $1^{st}$ cascade; there is a probability (X-Y) of two special symbols being placed into the symbol matrix for the $2^{nd}$ and $3^{rd}$ cascade and there is a probability (X-Z, where Z is greater than Y) of one special symbol being placed into the symbol matrix for the $4^{th}$ cascade and on. In some embodiments, there may be a maximum number of cascades allowed for a given game instance.

Assuming it is eventually determined, in step 714, that a cascade terminating condition is satisfied, the process continues to step 716. In step 716 it is determined whether the current value of the running count of special symbols accumulated during the current game instance (initial outcome and any resulting cascades that occurred prior to the cascade terminating condition) is greater than or equal to (or, in some embodiments, greater than) some predetermined or minimum value. If it is, then the process 700 continues to step 718 and the bonus feature is initiated. If not, the process 700 may end (e.g., the current game instance ends, no further cascades are triggered and the player is informed that he can place a new wager and request a new initial outcome for the game).

Figure 8E:
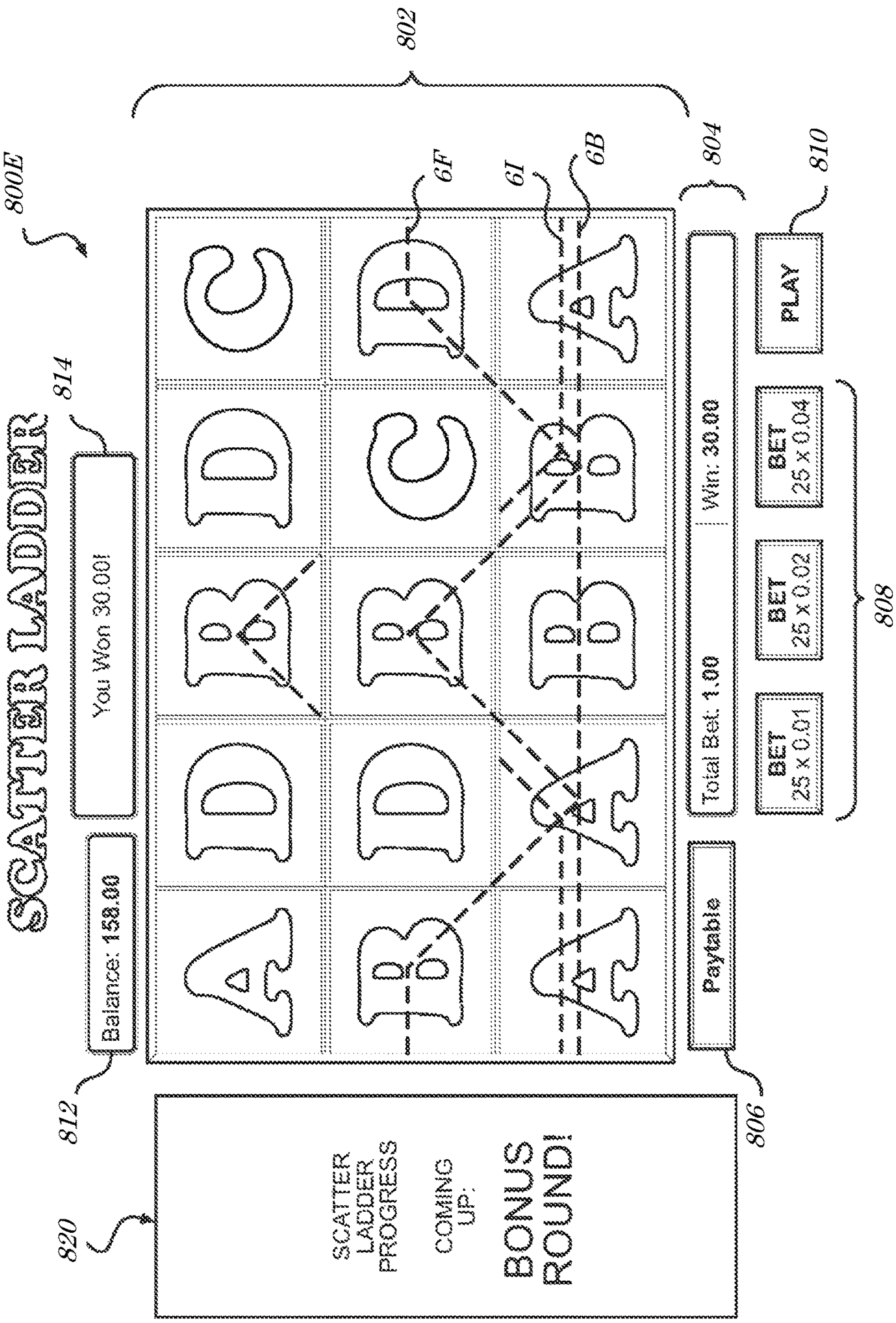

Turning now to FIG. 8E, screen shot 800E shows the progress in the game since that shown in FIG. 8D, once the results of the second cascade have been applied and a third reel cascade has been performed. Screen shot 800E also illustrates an example application of steps 714-718 of process 700 if the answer to step 714 is yes. The screen shot 800E illustrates the outcome which resulted from the removal and replacement of the three "C" symbols along each of paylines 6B, 6E and 6I. In particular, while no additional scatter symbols have been placed, new winning combinations of symbols have been created as follows: (i) three (3) "A" symbols have been placed along payline 6B, resulting in an additional win of 10.00 credits; (ii) three (3) "B" symbols have been placed along payline 6F, resulting in an additional win of 10.00 credits; and (iii) three (3) "A" symbols have been placed along payline 6I, resulting in yet another additional win of 10.00 credits. Thus, the player has won a total of 30.00 additional credits as a result of the third cascade (as indicated to the player in area 814 and area 804 of FIG. 8E).

The credit meter balance (shown in area 812) is illustrated as currently being 158.00 and now includes the 30.00 credits won as a result of the second cascade. It does not yet reflect the 30.00 additional credits won as a result of the third cascade.

Area 820 indicates to the player that the player has qualified for the bonus feature (because four (4) scatter symbols were collected as a result of the spin and any cascades resulting from the initial outcome of the spin). In accordance with some embodiments, the bonus feature may be initiated once no further cascades are triggered because a condition for triggering an additional cascade is not satisfied (e.g., no new winning combinations of symbols are created as a result of a preceding cascade). Thus, since new winning combinations of symbols were created along paylines 6B, 6E and 6I as a result of the third cascade, in some embodiments the initiation of the bonus round may be held in abeyance and a fourth cascade may be triggered. For purposes of brevity, an implementation and result of such a fourth cascade is not illustrated herein. It is sufficient to understand that since a predetermined or minimum number of special symbols have been collected during a single spin (which encompasses any cascades which result from the initial outcome of the spin), a bonus feature may be triggered (even if, in accordance with some embodiments, the initiation of the bonus feature may be held in abeyance until no additional cascades are triggered).

Figure 9:
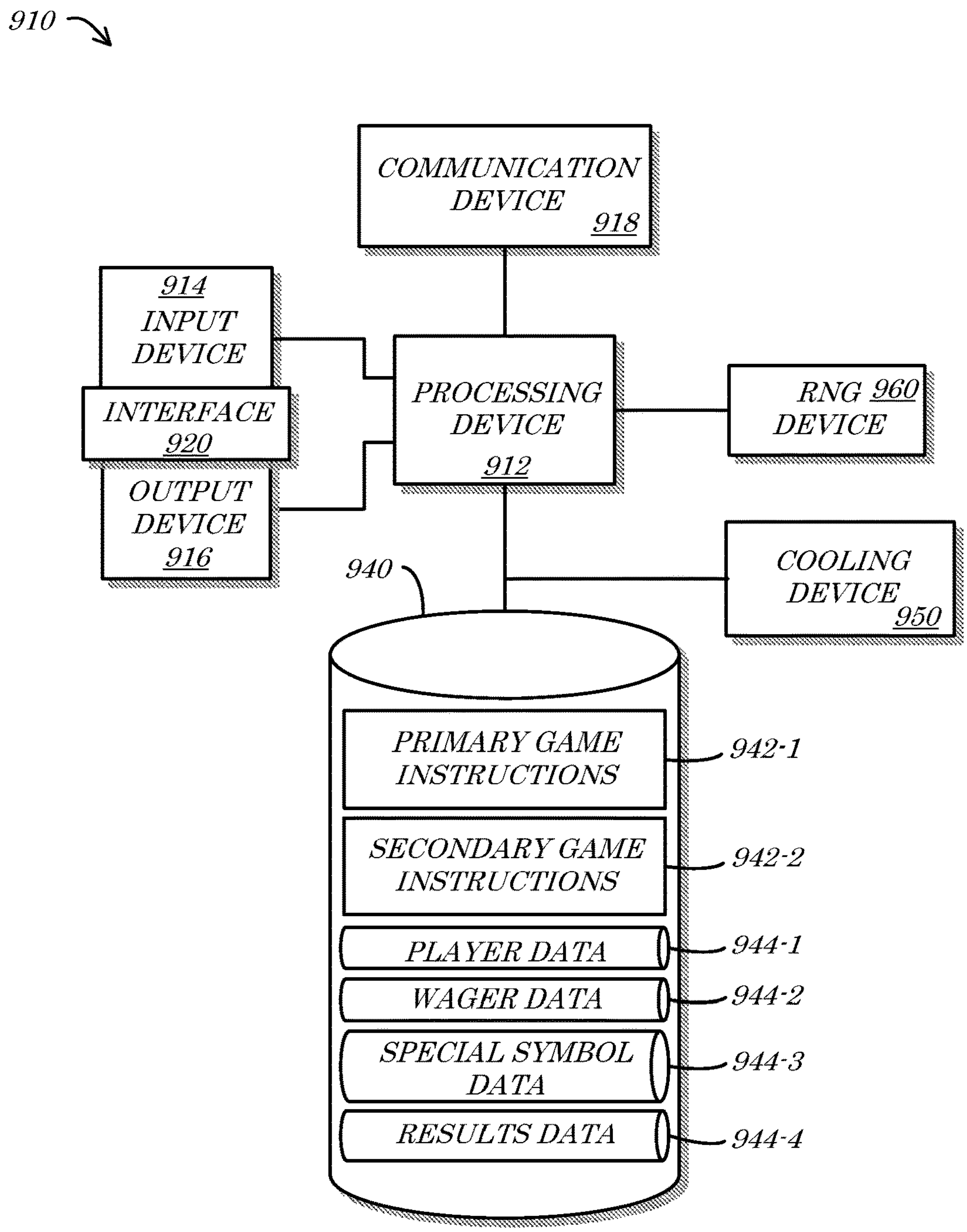
FIG. 9 is a block diagram of an embodiment of a computing device useful in a system according to one or more embodiments described herein.

Referring now to FIG. 9, illustrated therein is a block diagram of an apparatus 910 according to some embodiments. In some embodiments, the apparatus 910 may be similar in configuration and/or functionality to any of the player devices 102, the game server 110 and/or another server device operable to facilitate the embodiments described herein. The apparatus 910 may, for example, execute, process, facilitate, and/or otherwise be associated with any of the processes described herein. In accordance with some embodiments, the apparatus 910 may be similar in configuration and/or functionality to any of the player and/or user devices 102*a-n* (FIG. 1), 202*a-n* (FIG. 2), 302*a-b* (FIG. 3), 402 (FIG. 4) and/or 502 (FIG. 5) and/or the servers and/or controller devices 110 (FIG. 1), 210*a-n* (FIG. 2), 310*a-g* (FIG. 3), 410*e-f* (FIG. 4) and/or 510*a-j* (FIG. 5) herein, and/or may otherwise comprise a portion of the systems 100 (FIG. 1), 200 (FIG. 2), 300 (FIG. 3), 400 (FIG. 4), 500 (FIG. 5) and/or the process 700 (FIG. 7). The apparatus 910 may, for example, execute, process, facilitate, and/or otherwise be associated with the process 700 of FIG. 7 and/or one or more portions and/or combinations thereof.

In some embodiments, the apparatus 910 may comprise a processing device 912, an input device 914, an output device 916, a communication device 918, an interface 920, a memory device 940 (storing various programs and/or instructions 942 and data 944), a cooling device 950, and/or a Random Number Generator (RNG) 960. According to some embodiments, any or all of the components 912, 914, 916, 918, 920, 940, 942, 944, 950, 960 of the apparatus 910 may be similar in configuration and/or functionality to any similarly named and/or numbered components described herein. Fewer or more components 912, 914, 916, 918, 920, 940, 942, 944, 950, 960 and/or various configurations of the components 912, 914, 916, 918, 920, 940, 942, 944, 950, 960 be included in the apparatus 910 without deviating from the scope of embodiments described herein.

According to some embodiments, the processing device 912 may be or include any type, quantity, and/or configuration of electronic and/or computerized processor that is or becomes known. The processing device 912 may comprise, for example, an Intel® IXP 2800 network processor or an Intel® XEON™ Processor unit coupled with an Intel® E7501 chipset. In some embodiments, the processing device 912 may comprise multiple inter-connected units, processors, microprocessors, and/or micro-engines. According to some embodiments, the processing device 912 (and/or the apparatus 910 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 910 comprises a server such as a blade server, necessary power may be supplied via a standard AC outlet, power strip, surge protector, a PDU, and/or Uninterruptible Power Supply (UPS) device.

In some embodiments, the input device 914 and/or the output device 916 are communicatively coupled to the processing device 912 (e.g., via wired and/or wireless connections and/or pathways) and they may generally comprise any types or configurations of input and output components and/or devices that are or become known, respectively. The input device 914 may comprise, for example, a keyboard that allows an operator of the apparatus 910 to interface with the apparatus 910 (e.g., by a player, such as to place a wager in an online reel-type slot machine game that includes a special symbol cascade feature as described herein). In some embodiments, the input device 914 may comprise a sensor configured to provide information such as player input (e.g., player wager definitions) to the apparatus 902 and/or the processing device 912. The output device 916 may, according to some embodiments, comprise a display screen and/or other practicable output component and/or device. The output device 916 may, for example, provide the interface 920 to a player (e.g., via a website, electronic communications network device, and/or non-authorized software application; e.g., the interface 800 of FIGS. 8A through 8E as described herein). According to some embodiments, the input device 914 and/or the output device 916 may comprise and/or be embodied in a single device such as a touch-screen monitor (e.g., a device capable of both receiving input and providing output; e.g., via the interface 920).

In some embodiments, the communication device 918 may comprise any type or configuration of communication device that is or becomes known or practicable. The communication device 918 may, for example, comprise a Network Interface Card (NIC), a telephonic device, a cellular network device, a router, a hub, a modem, and/or a communications port or cable. In some embodiments, the communication device 918 may be coupled to provide data to a remote device (not shown in FIG. 9), such as in the case that the apparatus 910 is utilized to provide the interface 920 to a player as a client-side application of an online wagering game hosted by a remote server, as described herein. The communication device 918 may, for example, comprise a cellular telephone network transmission device that receives (and/or sends) signals indicative of game interface components to customer and/or subscriber handheld, mobile, and/or telephone device, e.g., from a remote server device. According to some embodiments, the communication device 918 may also or alternatively be coupled to the processing device 912. In some embodiments, the communication device 918 may comprise an IR, RF, Bluetooth™, NFC, and/or Wi-Fi® network device coupled to facilitate communications between the processing device 912 and another device (such as a third-party device, not shown).

The memory device 940 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 940 may, according to some embodiments, store one or more of primary game instructions 942-1, secondary (e.g., bonus) game instructions 942-2, player data 944-1, wager data 944-2, special symbol data 944-3, and/or results data 944-4. In some embodiments, the primary game instructions 942-1, secondary game instructions 942-2, player data 944-1, wager data 944-2, special symbol data 944-3, and/or results data 944-4 may be utilized by the processing device 912 to provide output information via the output device 916 and/or the communication device 918.

According to some embodiments, the primary game instructions 942-1 may be operable to cause the processing device 912 to process player data 944-1, wager data 944-2, special symbol data 944-3, and/or results data 944-4. Player data 944-1, wager data 944-2, special symbol data 944-3, and/or results data 944-4 received via the input device 914 and/or the communication device 918 may, for example, be analyzed, sorted, filtered, decoded, decompressed, ranked, scored, plotted, and/or otherwise processed by the processing device 912 in accordance with the primary game instructions 942-1. In some embodiments, player data 944-1, wager data 944-2, special symbol data 944-3, and/or results data 944-4 may be fed by the processing device 912 through one or more mathematical and/or statistical formulas and/or models in accordance with the primary game instructions 942-1 to provide an online or electronic casual or wagering game, such as an online reel-type slot machine game that includes a special symbol cascade feature, in accordance with embodiments described herein.

In some embodiments, the primary game instructions 942-1 may, for example, provide instructions for determining at least one of: (i) an outcome for the primary game responsive to a wager or other input from a player which initiates an event instance of the game (e.g., by requesting a random number from another server or device), (ii) which symbol positions (e.g., reel positions) should be populated with which symbols; (iii) determining, for each payline (or each active payline, depending on the embodiment being implemented) whether the outcome of the payline includes a winning combination and, if so, the payout or other award to provide to the player; (iv) increasing the credit balance of the player based on any payouts won as a result of the outcome; (v) whether any special symbols or regular symbols are to be removed from the symbol positions; (vi) updating a running count of removed special symbols; (vii) replacing all the removed symbols via a cascade feature; and/or (iv) re-evaluating each payline to determine whether the player has won any additional payouts as a result of the cascade. In some embodiments in which a cascade feature is utilized and a symbol in a top-most symbol positions is removed (such that there is no other symbol in a symbol position above the removed symbol), the primary game program 310*a* may further include instructions for determining a new symbol with which to replace the top-most removed symbol.

In some embodiments, the secondary game instructions 942-2 may be operable to cause the processing device 912 to process player data 944-1, wager data 944-2, special symbol data 944-3, and/or results data 944-4. Player data 944-1, wager data 944-2, special symbol data 944-3, and/or results data 944-4 received via the input device 914 and/or the communication device 918 may, for example, be analyzed, sorted, filtered, decoded, decompressed, ranked, scored, plotted, and/or otherwise processed by the processing device 912 in accordance with the secondary game instructions 942-2. In some embodiments, player data 944-1, wager data 944-2, special symbol data 944-3, and/or results data 944-4 may be fed by the processing device 912 through one or more mathematical and/or statistical formulas and/or models in accordance with the secondary game instructions 942-2 to provide an online or electronic casual or wagering game in addition to a base or primary game (e.g., a primary reel-type slot machine game that includes a special symbol cascade feature), such as a secondary or bonus feature of the game is triggered upon a sufficient number of special symbols being accumulated during a game instance of the primary game, such as during a primary outcome and any resulting cascades triggered as a result of the primary outcome, in accordance with embodiments described herein.

Any or all of the exemplary instructions and data types described herein and other practicable types of data may be stored in any number, type, and/or configuration of memory devices that is or becomes known. The memory device 940 may, for example, comprise one or more data tables or files, databases, table spaces, registers, and/or other storage structures. In some embodiments, multiple databases and/or storage structures (and/or multiple memory devices 940) may be utilized to store information associated with the apparatus 910. According to some embodiments, the memory device 940 may be incorporated into and/or otherwise coupled to the apparatus 910 (e.g., as shown) or may simply be accessible to the apparatus 910 (e.g., externally located and/or situated).

In some embodiments, the apparatus 910 may comprise the cooling device 950. According to some embodiments, the cooling device 950 may be coupled (physically, thermally, and/or electrically) to the processing device 912 and/or to the memory device 940. The cooling device 950 may, for example, comprise a fan, heat sink, heat pipe, radiator, cold plate, and/or other cooling component or device or combinations thereof, configured to remove heat from portions or components of the apparatus 910.

According to some embodiments, the apparatus 910 may comprise the RNG 960. The RNG 960 may comprise, for example, a specially-configured device and/or module for generating random (or pseudo random) numbers, e.g., in accordance with applicable regulations pertaining to gambling or wagering activities. The RNG 960 may comprise, for example, a secure and/or tamper resistant (or tamper evident) module that is inspected and/or approved by a regulatory entity for generating random outcomes for online wagering games.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium or an article of manufacture, which may be non-transitory in nature). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory", "article of manufacture" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

What is claimed is:

1. An online game server comprising:

a processor; and a computer-readable memory in communication with the processor, the computer-readable memory storing game instructions and interface instructions that when executed by the processor direct the processor to:

(a) receive, from a user device, a call for an online gaming interface for a virtual reel slot machine game, the call representing an initiation of a current game play of the virtual reel slot machine game, the current game play comprising a single spin of the virtual reel slot machine game and any resulting cascades triggered based on the single spin;

(b) generate, based on the interface instructions, a first state of the online gaming interface for the user device, the online gaming interface comprising (i) a plurality of virtual reels, each virtual reel including a plurality of electronic symbol positions; and (ii) a plurality of paylines, each payline being defined by a specific and distinct subset of the electronic symbol positions;

(c) receive, from a server comprising a random number generator module, a first data representing a first output of the random number generator module;

(d) identify, based on the first data, a first outcome for the current game play, wherein the first outcome includes at least one special qualifying symbol;

(e) modify the online gaming interface to a second state, the second state indicating the first outcome;

(f) perform, for the current game play, an initial evaluation of the plurality of paylines to identify any winning paylines;

(g) remove, after the initial evaluation, the at least one special qualifying symbol from the online gaming interface;

(h) update, for the current game play, a count of removed special qualifying symbols that was initiated upon an initiation of the current game play and that is being maintained specifically for use in the current game play and based on the removal of the at least one special qualifying symbol;

(i) modify, upon the special qualifying symbols being removed, the online gaming interface to a third state, wherein modifying the online gaming interface to the third state comprises displaying an animated sequence that moves at least one electronic symbol remaining in an electronic symbol position to a different electronic symbol position that has been vacated as a result of the at least one special qualifying symbol being removed;

wherein the removal of the special symbols occurs irrespective of whether the special qualifying symbols are part of any winning paylines; and further wherein the removal of the special symbols triggers the modifying the online gaming interface to the third state comprising displaying the animated sequence;

(j) perform, for the current game play, a second evaluation of the plurality of paylines to identify any additional winning paylines created as a result of the modifying of the online gaming interface to the third state;

(k) determine whether a current value for the count of removed special qualifying symbols that is being maintained specifically for use in the current game play, after the update, is at least equal to a minimum value; and (l) initiate a special bonus feature of the virtual reel slot machine game if the current value is at least equal to the minimum value by an end of the current game play.

2. The online game server of claim 1, wherein the computer-readable memory storing game instructions and interface instructions that when executed by the processor direct the processor to remove the special qualifying symbols comprise instructions that direct the processor to:

remove, after the initial evaluation, any regular symbols that are part of a winning combination of symbols from the online gaming interface; and wherein modifying the online gaming interface to the third state comprises displaying an animated sequence that moves at least one electronic symbol remaining in an electronic symbol position to a different electronic symbol position that has been vacated as a result of at least one of the at least one special qualifying symbol being removed and the any regular symbols being removed.

3. The online game server of claim 1, wherein the computer-readable memory storing game instructions and interface instructions further direct the processor to:

determine, after the online gaming interface is modified to a third state, whether at least one of the following conditions has occurred:

at least one additional special qualifying symbols has been placed into an electronic symbol position of the online gaming interface and removed; and at least one additional winning combination of symbols has been created as a result of the modifying of the online gaming interface to the third state and removed;

modify, upon the special qualifying symbols being removed, the online gaming interface to a fourth state, wherein modifying the online gaming interface to the fourth state comprises displaying an animated sequence that moves at least one electronic symbol remaining in an electronic symbol position to a different electronic symbol position that has been vacated as a result of the at least one special qualifying symbol or the at least one regular symbol being removed; and perform a third evaluation of the plurality of paylines to identify any additional winning paylines created as a result of the modifying of the online gaming interface to the fourth state.

4. The online game server of claim 1, wherein the at least one special qualifying symbol comprises a special symbol that is part of a winning combination of symbols.

5. The online game server of claim 1, wherein the computer-readable memory storing game instructions and interface instructions further direct the processor to:

repeat (g) through (l) until at least one terminating condition is satisfied.

6. The online game server of claim 5, wherein the at least one terminating condition comprises at least one of:

no additional special qualifying symbol is placed into an electronic symbol position as a result of (i);

no additional winning paylines are created as a result of (i); and it is determined as a result of (k) that the current value is at least equal to the minimum value.

7. The online game server of claim 1, wherein the computer-readable memory storing game instructions and interface instructions further direct the processor to determine whether at least one qualifying condition has been satisfied and only performing (g) through (l) if the qualifying condition has been satisfied.

8. The online game server of claim 7, wherein the at least one qualifying condition comprises at least one of:

the at least one special qualifying symbol being placed, as part of the first outcome, in a qualifying electronic symbol position of the online gaming interface;

a player associated with the first outcome having provided a maximum wager for the first outcome;

a player associated with the first outcome having maintained at least a minimum average wager during a wagering session;

a player associated with the first outcome having maintained at least a minimum rate of play during a wagering session; and a player associated with the first outcome having a corresponding rating.

9. The online game server of claim 8, wherein the qualifying electronic symbol position comprises a symbol position that is part of a winning payline.

10. The online game server of claim 8, wherein the qualifying electronic symbol position comprises a symbol position along an active payline.

11. The online game server of claim 1, wherein the computer-readable memory storing game instructions and interface instructions further direct the processor to:

receive, in response to receiving the call for the online game interface and from a special symbol module, a second data representing a number of special qualifying symbols to be included in the first outcome;

and wherein the instructions for directing the processor to perform (d) comprise instructions for directing the processor to:

identify, based on the first data and the second data, a first outcome.

12. A computer-readable medium storing game instructions and interface instructions that when executed by the processor cause the processor to:

(a) receive, from a user device, a call for an online gaming interface for a virtual reel slot machine game, the call representing an initiation of a current game play of the virtual reel slot machine game, the current game play comprising a single spin of the virtual reel slot machine game and any resulting cascades triggered based on the single spin;

(b) generate, based on the interface instructions, a first state of the online gaming interface for the user device, the online gaming interface comprising (i) a plurality of virtual reels, each virtual reel including a plurality of electronic symbol positions; and (ii) a plurality of paylines, each payline being defined by a specific and distinct subset of the electronic symbol positions;

(c) receive, from a server comprising a random number generator module, a first data representing a first output of the random number generator module;

(d) identify, based on the first data, a first outcome for the current game play, wherein the first outcome includes at least one special qualifying symbol;

(e) modify the online gaming interface to a second state, the second state indicating the first outcome;

(f) perform, for the current game play, an initial evaluation of the plurality of paylines to identify any winning paylines;

(g) remove, after the initial evaluation, the at least one special qualifying symbol from the online gaming interface;

(h) update, for the current game play, a count of removed special qualifying symbols that was initiated upon an initiation of the current game play and that is being maintained specifically for use in the current game play and based on the removal of the at least one special qualifying symbol;

(i) modify, upon the special qualifying symbols being removed, the online gaming interface to a third state, wherein modifying the online gaming interface to the third state comprises displaying an animated sequence that moves at least one electronic symbol remaining in an electronic symbol position to a different electronic symbol position that has been vacated as a result of the at least one special qualifying symbol being removed;

wherein the removal of the special symbols occurs irrespective of whether the special qualifying symbols are part of any winning paylines; and further wherein the removal of the special symbols triggers the modifying the online gaming interface to the third state comprising displaying the animated sequence;

(j) perform, for the current game play, a second evaluation of the plurality of paylines to identify any additional winning paylines created as a result of the modifying of the online gaming interface to the third state;

(k) determine whether a current value for the count of removed special qualifying symbols that is being maintained specifically for use in the current game play, after the update, is at least equal to a minimum value; and (l) initiate a special bonus feature of the virtual reel slot machine game if the current value is at least equal to the minimum value by an end of the current game play.

13. The computer-readable medium of claim 12, wherein the computer-readable game instructions and interface instructions when executed by the processor cause the processor to remove the special qualifying symbols comprise instructions that cause the processor to:

remove, after the initial evaluation, any regular symbols that are part of a winning combination of symbols from the online gaming interface; and wherein modifying the online gaming interface to the third state comprises displaying an animated sequence that moves at least one electronic symbol remaining in an electronic symbol position to a different electronic symbol position that has been vacated as a result of at least one of the at least one special qualifying symbol being removed and the any regular symbols being removed.

14. The computer-readable medium of claim 12, wherein the computer-readable game instructions and interface instructions when executed by the processor further cause the processor to:

determine, after the online gaming interface is modified to a third state, whether at least one of the following conditions has occurred:

at least one additional special qualifying symbols has been placed into an electronic symbol position of the online gaming interface and removed; and at least one additional winning combination of symbols has been created as a result of the modifying of the online gaming interface to the third state and removed;

modify, upon the special qualifying symbols being removed, the online gaming interface to a fourth state, wherein modifying the online gaming interface to the fourth state comprises displaying an animated sequence that moves at least one electronic symbol remaining in an electronic symbol position to a different electronic symbol position that has been vacated as a result of the at least one special qualifying symbol or the at least one regular symbol being removed; and perform a third evaluation of the plurality of paylines to identify any additional winning paylines created as a result of the modifying of the online gaming interface to the fourth state.

15. The computer-readable medium of claim 12, wherein the computer-readable game instructions and interface instructions when executed by the processor further cause the processor to:

repeat (g) through (l) until at least one terminating condition is satisfied.

16. The computer-readable medium of claim 15, wherein the at least one terminating condition comprises at least one of:

no additional special qualifying symbol is placed into an electronic symbol position as a result of (i);

no additional winning paylines are created as a result of (i); and it is determined as a result of (k) that the current value is at least equal to the minimum value.

17. The computer-readable medium of claim 15, wherein the computer-readable memory storing game instructions and interface instructions further direct the processor to determine whether at least one qualifying condition has been satisfied and only performing (g) through (l) if the qualifying condition has been satisfied.

18. The computer-readable medium of claim 17, wherein the at least one qualifying condition comprises at least one of:

the at least one special qualifying symbol being placed, as part of the first outcome, in a qualifying electronic symbol position of the online gaming interface;

a player associated with the first outcome having provided a maximum wager for the first outcome;

a player associated with the first outcome having maintained at least a minimum average wager during a wagering session;

a player associated with the first outcome having maintained at least a minimum rate of play during a wagering session; and a player associated with the first outcome having a corresponding rating.

19. The computer-readable medium of claim 12, wherein the computer-readable memory storing game instructions and interface instructions further direct the processor to wherein the computer-readable memory storing game instructions and interface instructions further direct the processor to:

receive, in response to receiving the call for the online game interface and from a special symbol module, a second data representing a number of special qualifying symbols to be included in the first outcome;

and wherein the instructions for directing the processor to perform (d) comprise instructions for directing the processor to:

identify, based on the first data and the second data, a first outcome.

* * * * *